US011500811B2

(12) United States Patent
Fang et al.

(10) Patent No.: US 11,500,811 B2
(45) Date of Patent: Nov. 15, 2022

(54) APPARATUSES AND METHODS FOR MAP REDUCE

(71) Applicant: ALIBABA GROUP HOLDING LIMITED, Grand Cayman (KY)

(72) Inventors: Yuanwei Fang, San Mateo, CA (US);
Tae Meon Bae, San Mateo, CA (US);
Sicheng Li, San Mateo, CA (US);
Minghai Qin, San Mateo, CA (US);
Guanlin Wu, San Mateo, CA (US);
Yen-kuang Chen, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/900,155

(22) Filed: Jun. 12, 2020

(65) Prior Publication Data

US 2021/0390076 A1 Dec. 16, 2021

(51) Int. Cl.
*G06F 17/16* (2006.01)
*G06F 15/80* (2006.01)
(Continued)

(52) U.S. Cl.
CPC .......... *G06F 15/80* (2013.01); *G06F 13/1668* (2013.01); *G06N 3/08* (2013.01); *G06F 17/16* (2013.01)

(58) Field of Classification Search
CPC ...... G06F 15/80; G06F 13/1668; G06F 17/16; G06N 3/08
See application file for complete search history.

(56) References Cited

U.S. PATENT DOCUMENTS 5,280,474 A * 1/1994 Nickolls ........... G06F 15/17393
714/802
5,535,410 A * 7/1996 Watanabe ........... G06F 9/30189
712/E9.035
(Continued)

FOREIGN PATENT DOCUMENTS

WO WO-2020057162 A1 * 3/2020

OTHER PUBLICATIONS

Qadeer et al., "Convolution Engine: Balancing Efficiency & Flexibility in Specialized Computing," ISCA, pp. 24-35 (2013).
(Continued)

*Primary Examiner* — Cheng Yuan Tseng
(74) *Attorney, Agent, or Firm* — Finnegan, Henderson, Farabow, Garrett & Dunner, LLP

(57) ABSTRACT

The present disclosure relates to a method and an apparatus for map reduce. In some embodiments, an exemplary processing unit includes: a 2-dimensional (2D) processing element (PE) array comprising a plurality of PEs, each PE comprising a first input and a second input, the first inputs of the PEs in a linear array in a first dimension of the PE array being connected in series and the second inputs of the PEs in a linear array in a second dimension of the PE array being connected in parallel, each PE being configured to perform an operation on data from the first input or second input; and a plurality of reduce tree units, each reduce tree unit being coupled with the PEs in a linear array in the first dimension or the second dimension of the PE array and configured to perform a first reduction operation.

18 Claims, 9 Drawing Sheets

(51) Int. Cl.
*G06N 3/08* (2006.01)
*G06F 13/16* (2006.01)

(56) References Cited

U.S. PATENT DOCUMENTS

| | | | | |
|---|---|---|---|---|
| 5,815,723 | A * | 9/1998 | Wilkinson | G06F 15/17381 |
| | | | | 712/E9.055 |
| 5,822,608 | A * | 10/1998 | Dieffenderfer | G06F 15/803 |
| | | | | 712/E9.055 |
| 6,728,863 | B1 * | 4/2004 | Jackson | G06F 15/8023 |
| | | | | 712/22 |
| 7,196,708 | B2 * | 3/2007 | Dorojevets | G06F 15/8092 |
| | | | | 712/E9.046 |
| 7,472,392 | B2 * | 12/2008 | Beaumont | G06F 9/5083 |
| | | | | 718/104 |
| 10,761,877 | B2 * | 9/2020 | Peffers | G06F 9/5044 |
| 10,915,773 | B2 * | 2/2021 | Chang | G06T 1/20 |
| 10,996,959 | B2 * | 5/2021 | Morad | G06F 9/3877 |
| 2002/0174318 | A1 * | 11/2002 | Stuttard | G06F 15/8015 |
| | | | | 714/11 |
| 2019/0251425 | A1 * | 8/2019 | Jaffari | G06F 17/16 |
| 2020/0394495 | A1 * | 12/2020 | Moudgill | G06N 3/0481 |
| 2021/0004668 | A1 * | 1/2021 | Moshovos | G06N 3/0454 |
| 2021/0117755 | A1 * | 4/2021 | Mahale | G06N 3/0454 |
| 2021/0125046 | A1 * | 4/2021 | Moshovos | G06N 3/0454 |

OTHER PUBLICATIONS

"NVDLA Primer—NVDLA Documentation," downloaded from nvdla.org/primer.html, 14 pages (2020).

Jouppi et al., "In-Datacenter Performance Analysis of a Tensor Processing Unit," ISCA, 12 pages (2017).

Shao et al., "Simba: Scaling Deep-Learning Inference with Multi-Chip-Module-Based Architecture," MICRO-52, 14 pages (2019).

* cited by examiner

APPARATUSES AND METHODS FOR MAP REDUCE

BACKGROUND

Transcoding, such as video transcoding, is widely used in industry and daily life. Transcoding can convert a file (e.g., a digital movie) from one coding format to another. In recent years, the rise and development of visual cloud applications and data centers require cost-effective transcoding solutions.

Machine learning (ML) or deep learning (DL) has been growing exponentially in the last decade. ML and DL use neural networks, which are mechanisms that basically mimic how a human brain learns. These neural networks can often use large data sets, resulting in a very time-consuming training process. ML or DL enables rapid algorithm changes in transcoding. But the processing speed and communication latency may limit overall performance of transcoding and ML or DL solutions.

SUMMARY

In some embodiments, an exemplary processing unit can include a 2-dimensional (2D) processing element (PE) array comprising a plurality of PEs, each PE comprising a first input and a second input, the first inputs of the PEs in a first linear array in a first dimension of the PE array being connected in series and the second inputs of the PEs in a second linear array in a second dimension of the PE array being connected in parallel, each PE being configured to perform an operation on data from the first input or second input; and a plurality of reduce tree units, each reduce tree unit being coupled with the PEs in a linear array in the first dimension or the second dimension of the PE array and configured to perform a first reduction operation.

In some embodiments, an exemplary processing system includes a host unit configured to provide instructions and a processing unit. The processing unit includes a 2-dimensional (2D) processing element (PE) array comprising a plurality of PEs, each PE comprising a first input and a second input, the first inputs of the PEs in a first linear array in a first dimension of the PE array being connected in series and the second inputs of the PEs in a second linear array in a second dimension of the PE array being connected in parallel, each PE being configured to perform an operation on data from the first input or second input; and a plurality of reduce tree units, each reduce tree unit being coupled with the PEs in a linear array in the first dimension or the second dimension of the PE array and configured to perform a first reduction operation. The processing unit is configured to receive the instructions from the host unit for configuring the PE array and the plurality of reduce tree units.

In some embodiments, an exemplary method performed by a processing unit comprising a 2-dimensional (2D) processing element (PE) array and a plurality of reduce tree units can include: shifting a first data into a linear array in a first dimension of the PE array of the processing unit via first inputs of PEs in the linear array in the first dimension of the PE array that are connected in series; broadcasting a second data to a linear array in a second dimension of the PE array via second inputs of PEs in the linear array in the second dimension of the PE array that are connected in parallel; performing, by the PEs, operations on the shifted data or broadcasted data; and performing, by one or more of a plurality of reduce tree units of the processing unit, a first reduction operation on results from the PEs, each reduce tree unit of the plurality of reduce tree units being coupled with PEs in a linear array in the first dimension or the second dimension of the PE array.

In some embodiments, an exemplary method for configuring a processing unit including a 2-dimensional (2D) processing element (PE) array includes acquiring instructions for selecting a type of function from multiple types of functions to be performed by the processing unit and based on the acquired instructions, configuring a plurality of processing elements (PEs) of the 2D PE array and a plurality of reduce tree units to perform operations on a first input data and a second input data corresponding to the selected type of function. The plurality of PEs are configured to shift the first input data into a first linear array of PEs in a first dimension of the 2D PE array and broadcast the second input data into a second linear array of PEs in a second dimension of the 2D PE array. If a first type of function is selected, the plurality of PEs are configured to maintain the first input data during broadcast of the second data for performing operations corresponding to the first type of function. If a second type of function is selected, the plurality of PEs are configured to maintain the second input data during shift of the first data for performing operations corresponding to the second type of function. One or more of the plurality of reduce tree units of the processing unit are configured to perform first reduction operations on results from the first linear array of PEs or the second linear array of PEs.

Additional features and advantages of the present disclosure will be set forth in part in the following detailed description, and in part will be obvious from the description, or may be learned by practice of the present disclosure. The features and advantages of the present disclosure will be realized and attained by means of the elements and combinations particularly pointed out in the appended claims.

It is to be understood that the foregoing general description and the following detailed description are exemplary and explanatory only, and are not restrictive of the disclosed embodiments.

BRIEF DESCRIPTION OF THE DRAWINGS

The accompanying drawings, which comprise a part of this specification, illustrate several embodiments and, together with the description, serve to explain the principles and features of the disclosed embodiments. In the drawings.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses, systems and methods consistent with aspects related to the invention as recited in the appended claims.

As stated above, the rise and development of visual cloud applications and data centers require cost-effective transcoding solutions that convert a file (e.g., a digital movie) from one coding format to another. While some conventional systems use ML or DL with the transcoding process, these systems have flaws in that they limit overall performance of transcoding and ML or DL solutions. For example, for some conventional designs, transcoding, ML or DL, video analytics, database, bioinformatics, or the like, may be supported by separate pieces of hardware, which increases the complexity and latency of the processing and limits the total performance of the hardware.

Embodiments of the present disclosure can improve on these conventional designs. In some embodiments, for example, a processing unit or processing element can implement multiple types of processing, including, but not being limited to, transcoding (e.g., video transcoding), ML or DL, video analytics, database, bioinformatics, or the like. In some embodiments, the processing unit or processing element can also allow efficient switching among different types of processing and thus achieve low-latency and high-performance processing.

It is appreciated that embodiments of the present disclosure can be implemented by various processing devices, including, but not limited to, a processor (e.g., a central processing unit (CPU)), a neural network processing unit (NPU), a graphics processing unit (GPU), a field programmable gate array (FPGA), a tensor processing unit (TPU), an application-specific integrated circuit (ASIC), and the like.

Figure 1A:
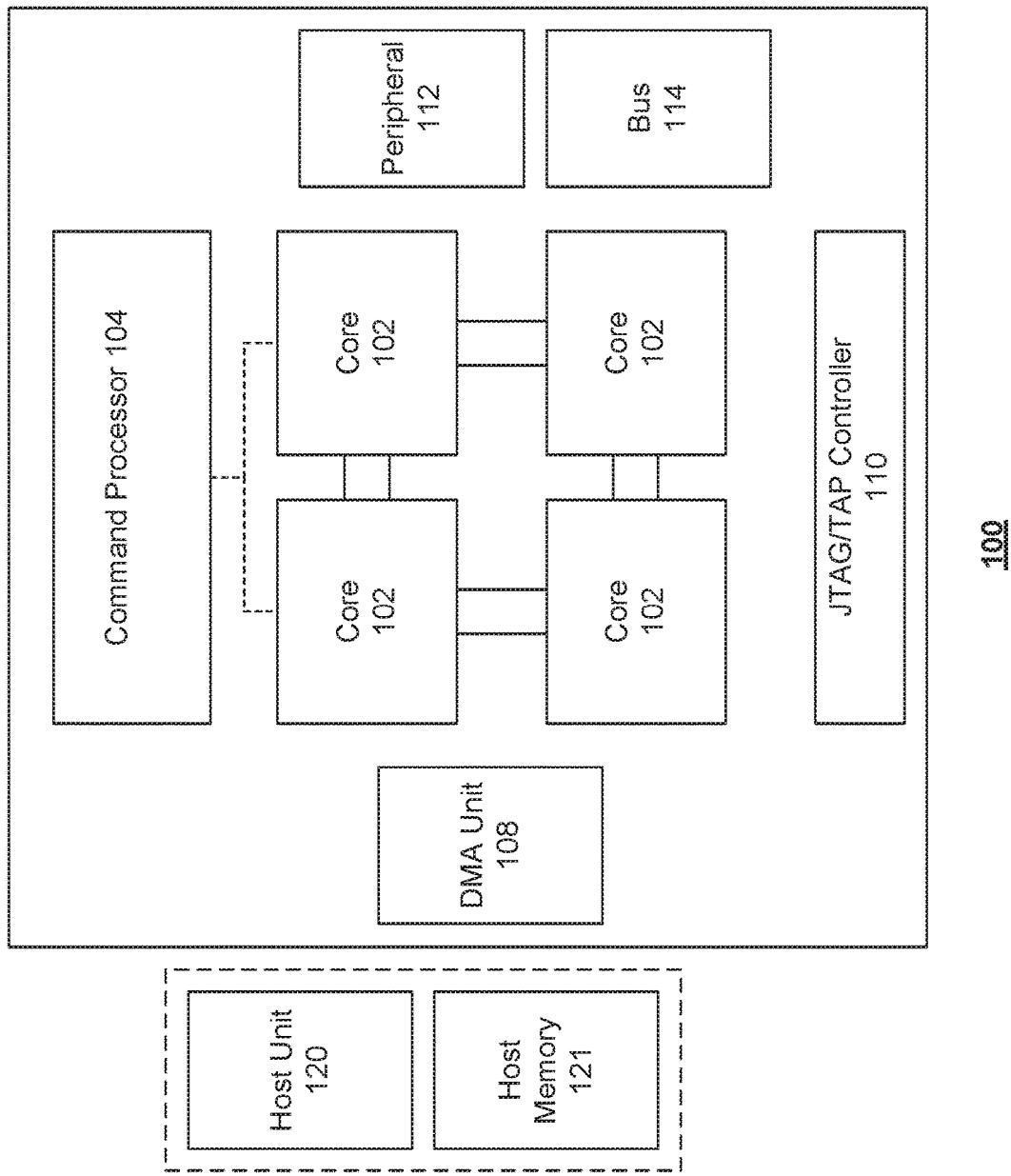
FIG. 1A illustrates an exemplary neural network accelerator architecture, according to some embodiments of the present disclosure.

FIG. 1A illustrates an exemplary neural network accelerator architecture, according to some embodiments of the present disclosure. In the context of this disclosure, a neural network accelerator may also be referred to as a machine learning accelerator or deep learning accelerator. In some embodiments, accelerator architecture 100 may be referred to as a neural network processing unit (NPU) architecture 100. As shown in FIG. 1A, accelerator architecture 100 can include a plurality of cores 102, a command processor 104, a direct memory access (DMA) unit 108, a Joint Test Action Group (JTAG)/Test Access End (TAP) controller 110, a peripheral interface 112, a bus 114, and the like.

It is appreciated that, cores 102 can perform algorithmic operations based on communicated data. Cores 102 can include one or more processing elements that may include single instruction, multiple data (SIMD) architecture including one or more operation units configured to perform one or more operations (e.g., multiplication (MUL), addition (ADD), multiply-accumulate (MAC), subtraction (SUB), sum of absolute difference (SAD), absolute value (ABS), shift, logical operations, or the like) based on commands received from command processor 104. To perform the operation on the communicated data packets, cores 102 can include one or more processing elements for processing information in the data packets. Each processing element may comprise any number of operation units. According to some embodiments of the present disclosure, accelerator architecture 100 may include a plurality of cores 102, e.g., four cores. In some embodiments, the plurality of cores 102 can be communicatively coupled with each other. For example, the plurality of cores 102 can be connected with a single directional ring bus, which supports efficient pipelining for large neural network models.

Command processor 104 can interact with a host unit 120 and pass pertinent commands and data to corresponding core 102. In some embodiments, command processor 104 can interact with host unit under the supervision of kernel mode driver (KMD). In some embodiments, command processor 104 can modify the pertinent commands to each core 102, so that cores 102 can work in parallel as much as possible. The modified commands can be stored in an instruction buffer. In some embodiments, command processor 104 can be configured to coordinate one or more cores 102 for parallel execution.

DMA unit 108 can assist with transferring data between host memory 121 and accelerator architecture 100. For example, DMA unit 108 can assist with loading data or instructions from host memory 121 into local memory of cores 102. DMA unit 108 can also assist with transferring data between multiple accelerators. DMA unit 108 can allow off-chip devices to access both on-chip and off-chip memory without causing a host CPU interrupt. In addition, DMA unit 108 can assist with transferring data between components of accelerator architecture 100. For example, DMA unit 108 can assist with transferring data between multiple cores 102 or within each core. Thus, DMA unit 108 can also generate memory addresses and initiate memory read or write cycles. DMA unit 108 also can contain several hardware registers that can be written and read by the one or more cores, including a memory address register, a byte-count register, one or more control registers, and other types of registers. These registers can specify some combination of the source, the destination, the direction of the transfer (reading from the input/output (I/O) device or writing to the I/O device), the size of the transfer unit, or the number of bytes to transfer in one burst. It is appreciated that accelerator architecture 100 can include a second DMA unit, which can be used to transfer data between other accelerator architectures to allow multiple accelerator architectures to communicate directly without involving the host CPU.

JTAG/TAP controller 110 can specify a dedicated debug port implementing a serial communications interface (e.g., a JTAG interface) for low-overhead access to the accelerator without requiring direct external access to the system address and data buses. JTAG/TAP controller 110 can also have on-chip test access interface (e.g., a TAP interface) that implements a protocol to access a set of test registers that present chip logic levels and device capabilities of various parts.

Peripheral interface 112 (such as a PCIe interface), if present, serves as an (and typically the) inter-chip bus, providing communication between the accelerator and other devices.

Bus 114 (such as a I2C bus) includes both intra-chip bus and inter-chip buses. The intra-chip bus connects all internal components to one another as called for by the system architecture. While not all components are connected to every other component, all components do have some connection to other components they need to communicate with. The inter-chip bus connects the accelerator with other devices, such as the off-chip memory or peripherals. For example, bus 114 can provide high speed communication across cores and can also connect cores 102 with other units, such as the off-chip memory or peripherals. Typically, if there is a peripheral interface 112 (e.g., the inter-chip bus), bus 114 is solely concerned with intra-chip buses, though in some implementations it could still be concerned with specialized inter-bus communications.

Accelerator architecture 100 can also communicate with a host unit 120. Host unit 120 can be one or more processing units (e.g., an X86 central processing unit (CPU)). As shown in FIG. 1A, host unit 120 may be associated with host memory 121. In some embodiments, host memory 121 may be an integral memory or an external memory associated with host unit 120. In some embodiments, host memory 121 may comprise a host disk, which is an external memory configured to provide additional memory for host unit 120. Host memory 121 can be a double data rate synchronous dynamic random-access memory (e.g., DDR SDRAM) or the like. Host memory 121 can be configured to store a large amount of data with slower access speed, compared to the on-chip memory integrated within accelerator chip, acting as a higher-level cache. The data stored in host memory 121 may be transferred to accelerator architecture 100 to be used for executing neural network models.

In some embodiments, a host system having host unit 120 and host memory 121 can comprise a compiler (not shown). The compiler is a program or computer software that transforms computer codes written in one programming language into instructions for accelerator architecture 100 to create an executable program. In machine learning applications, a compiler can perform a variety of operations, for example, pre-processing, lexical analysis, parsing, semantic analysis, conversion of input programs to an intermediate representation, initialization of a neural network, code optimization, and code generation, or combinations thereof. For example, the compiler can compile a neural network to generate static parameters, e.g., connections among neurons and weights of the neurons.

In some embodiments, host system including the compiler may push one or more commands to accelerator architecture 100. As discussed above, these commands can be further processed by command processor 104 of accelerator architecture 100, temporarily stored in an instruction buffer (not shown) of accelerator architecture 100, and distributed to corresponding one or more cores (e.g., cores 102 in FIG. 1A) or processing elements. Some of the commands may instruct a DMA unit (e.g., DMA unit 108 of FIG. 1A) to load instructions and data from host memory (e.g., host memory 121 of FIG. 1A) into accelerator architecture 100. The loaded instructions may then be distributed to each core (e.g., core 102 of FIG. 1A) assigned with the corresponding task, and the one or more cores may process these instructions.

It is appreciated that the first few instructions received by the cores 102 may instruct the cores 102 to load/store data received from host memory 121 or processed data by accelerator architecture 100 into one or more local memories of the cores or one or more local memories of the processing elements (not shown in FIG. 1A) in the core. Each core 102 may then initiate the instruction pipeline, which involves fetching the instruction (e.g., via a sequencer) from the instruction buffer, decoding the instruction (e.g., via a DMA unit 108 of FIG. 1A), generating local memory addresses (e.g., corresponding to an operand), reading the source data, executing or loading/storing operations, and then writing back results.

According to some embodiments, accelerator architecture 100 can further include a global memory (not shown) having memory blocks (e.g., 4 blocks of 8 GB second generation of high bandwidth memory (HBM2)) to serve as main memory. In some embodiments, the global memory can store instructions and data from host memory 121 via DMA unit 108. The instructions can then be distributed to an instruction buffer of each core assigned with the corresponding task, and the core can process these instructions accordingly.

In some embodiments, accelerator architecture 100 can further include memory controller (not shown) configured to manage reading and writing of data to and from a specific memory block (e.g., HBM2) within global memory. For example, memory controller can manage read/write data coming from core of another accelerator (e.g., from DMA unit 108 or a DMA unit corresponding to the another accelerator) or from core 102 (e.g., from a local memory in core 102). It is appreciated that more than one memory controller can be provided in accelerator architecture 100. For example, there can be one memory controller for each memory block (e.g., HBM2) within global memory.

Memory controller can generate memory addresses and initiate memory read or write cycles. Memory controller can contain several hardware registers that can be written and read by the one or more processors. The registers can include a memory address register, a byte-count register, one or more control registers, and other types of registers. These registers can specify some combination of the source, the destination, the direction of the transfer (reading from the input/output (I/O) device or writing to the I/O device), the size of the transfer unit, the number of bytes to transfer in one burst, or other typical features of memory controllers.

It is appreciated that accelerator architecture 100 of FIG. 1A can be utilized in various neural networks, such as deep neural networks (DNNs), convolutional neural networks (CNNs), recurrent neural networks (RNNs), or the like. In addition, some embodiments can be configured for various processing architectures, such as NPUs, GPUs, FPGAs, TPUs, ASICs, any other types of heterogeneous accelerator processing units (HAPUs), or the like.

Figure 1B:
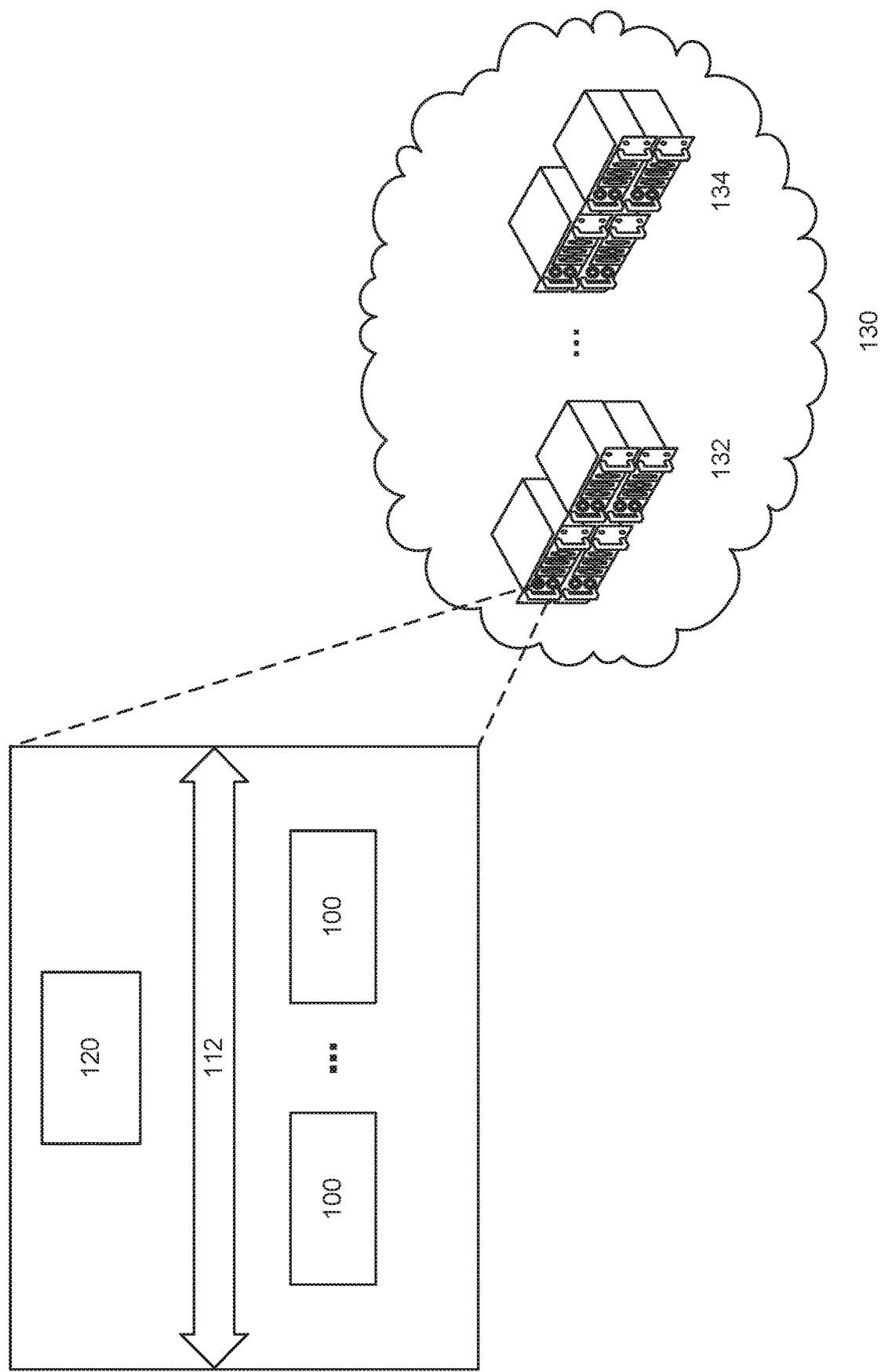
FIG. 1B illustrates a schematic diagram of an exemplary cloud system incorporating a neural network accelerator, according to some embodiments of the present disclosure.

FIG. 1B illustrates a schematic diagram of an exemplary cloud system 130 incorporating accelerator architecture 100, according to some embodiments of the present disclosure. As shown in FIG. 1B, cloud system 130 can provide a cloud service with artificial intelligence (AI) capabilities and can include a plurality of computing servers (e.g., 132 and 134). In some embodiments, a computing server 132 can, for example, incorporate a neural network accelerator architecture 100 of FIG. 1A. Neural network accelerator architecture 100 is shown in FIG. 1B in a simplified manner for simplicity and clarity.

With the assistance of neural network accelerator architecture 100, cloud system 130 can provide the extended AI capabilities of image recognition, facial recognition, translations, 3D modeling, transcoding, video analytics, database, bioinformatics, and the like. It is appreciated that, neural network accelerator architecture 100 can be deployed to computing devices in other forms. For example, neural network accelerator architecture 100 can also be integrated in a computing device, such as a smart phone, a tablet, and a wearable device.

Figure 2:
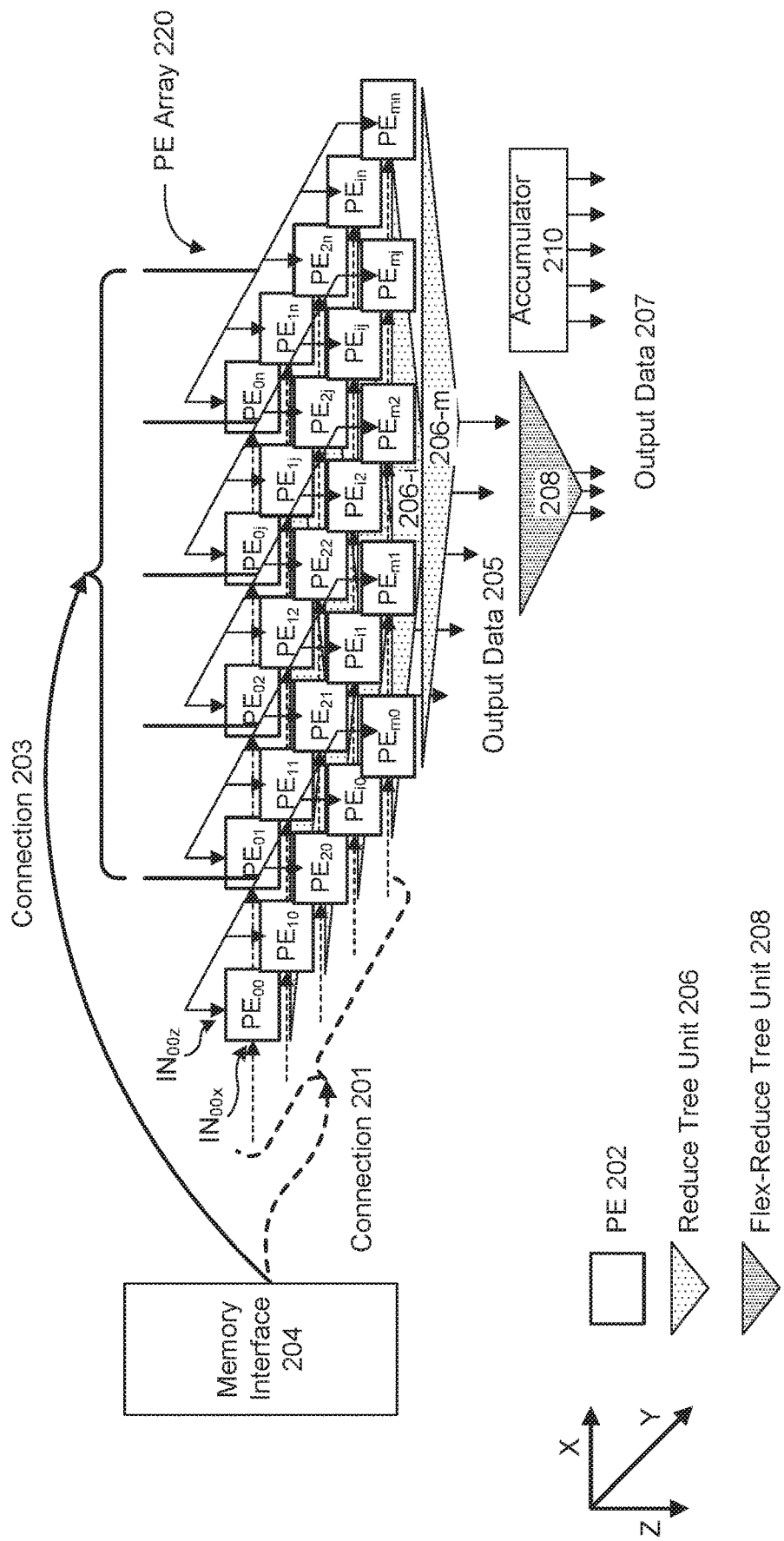
FIG. 2 illustrates a schematic diagram of an exemplary processing unit, according to some embodiments of the present disclosure.

FIG. 2 illustrates a schematic diagram of an exemplary processing unit 200, according to some embodiments of the present disclosure. Processing unit 200 can be implemented by or together with a processor (e.g., a CPU), an NPU, a GPU, a FPGA, a TPU, an ASIC, or the like. For example, processing unit 200 can be implemented as a core 102 in accelerator 100 of FIG. 1A. In some embodiments, processing unit 200 can be a map reduce unit (MRU). For convenience and clarity, processing unit 200 is shown in a 3-dimensional (3D) space with x, y, and z directions. It is appreciated that, however, components of processing unit 200 are not limited to the spatial arrangement as shown in FIG. 2, but can be implemented in any suitable spatial arrangement and physical structure.

As shown in FIG. 2, processing unit 200 can include a plurality of processing elements (PEs) 202, a memory interface 204, a plurality of reduce tree units 206, and the like. In some embodiments, PE 202 can be implemented as a map block of the MRU. Memory interface 204 can be communicatively coupled with an external memory (such as host memory 121 of FIG. 1A, local memory or global memory of accelerator 100 of FIG. 1A). Processing unit 200 can read or receive data or instructions from eternal memory via memory interface 204. It is appreciated that, in some embodiments, processing unit 200 can include a local memory in addition to or instead of memory interface 204. The local memory can provide storage space with fast read/write speed for other components in processing unit 200. To reduce possible interaction with external memory, storage space of the local memory can be implemented with large capacity. With the massive storage space, most of data access can be performed within processing unit 200 with reduced latency caused by data access. In some embodiments, to minimize data loading latency and energy consumption, SRAM integrated on chip can be used as local memory.

As shown in FIG. 2, the plurality of PEs 202 can form a PE array 220. For example, PE array 220 can have m+1 rows and n+1 columns and thus include (m+1)×(n+1) PEs 202, where m and n are integers. In some embodiments, m and n are positive integers. The row of PE array 220 can extend along x direction and the column of PE array 220 can extend along y direction. $PE_{ij}$ represents a PE in the i-th row and j-th column. Each PE 202 can be homogenous and support a set of logical and arithmetic operators, such as MUL, ADD, SUB, SAD, ABS, shift, logical operators, move (MOV), or the like. In some embodiments, PEs 202 can support SIMD and operate on the same instruction stream.

Figure 3:
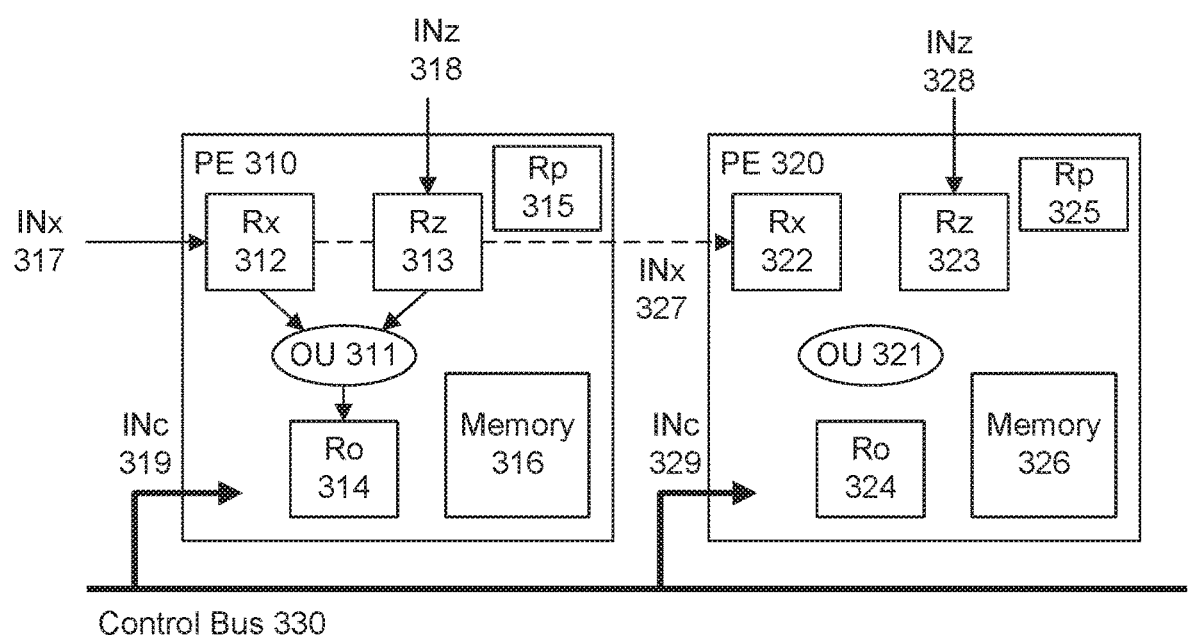
FIG. 3 illustrates a schematic diagram of exemplary processing elements, according to some embodiments of the present disclosure.

In some embodiments, processing unit 200 can include a control bus (not shown in FIG. 2, e.g., control bus 303 of FIG. 3). The control bus can be connected with and convey control signal or instructions to PEs 202 in PE array 220. For example, the control bus can convey operation instructions to one or more PEs 202 in PE array 220 for processing.

PE 202 can include a plurality of inputs (or input terminals), e.g., one or more data inputs or one or more control inputs. For example, as shown in FIG. 2, $PE_{00}$ can include a data input $IN_{00x}$ in x direction and a data input $IN_{00z}$ in z direction. In general, $PE_{ij}$ can include a data input $IN_{ijx}$ in x direction and a data input $IN_{ijz}$ in z direction. $PE_{ij}$ can read or receive a first data via data input $IN_{ijx}$ and a second data via data input $IN_{ijz}$. In some embodiments, $PE_{ij}$ can also include a control input (not shown in FIG. 2, e.g., control input INc 319 or INc 329 of FIG. 3) that can be connected with the control bus. The control bus can convey control signal or instructions to PEs 202 via control inputs. Although described as separate inputs, the data input and the control input can be combined into a universal input.

PE array 220 can be communicatively connected with memory interface 204 or the local memory (not shown). For example, as shown in FIG. 2, processing unit 200 can include a connection 201 that connects PE array 220 with memory interface 204 in x direction and a connection 203 which connects PE array 220 with memory interface 204 in z direction. The connections 201 and 203 can have any topology structures, e.g., bus topology, star topology, point-to-point topology, tree topology, the combination thereof, or the like. Thus, data can be conveyed, via connection 201 or connection 203, to PEs 202 in PE array 220 in a manner of shift, broadcast, multicast, or the like. As shown in FIG. 2, for example, in x direction, connection 201 can connect 0th column of PEs 202 in PE array 220, e.g., $PE_{00}$, $PE_{10}$, $PE_{20}$, ..., $PE_{i0}$, ..., $PE_{m0}$, with memory interface 204. Additionally, connection 201 can connect a row of PEs 202 in PE array 220 in series. Then, data (e.g., a vector) can be shifted from memory interface 204 into a row of PEs 202 in PE array 220 and distributed in this row of PEs 202. Alternatively, the data (e.g., a vector) can be shifted through a row of PEs by shifting each element of the vector sequentially into or through PEs in the row step by step. For example, in the 0th row of PE array 220, $PE_{00}$, $PE_{01}$, $PE_{02}$, ..., $PE_{0j}$, ..., $PE_{0n}$ can be connected one to another in series via connection 201. At a first shift step, $PE_{00}$ in the 0th column can read or receive data, e.g., a 0th element $I_0$ of a vector I ($I_0$, $I_1$, ..., $I_h$) with h elements, from an external memory via memory interface 204 (or from a local memory of processing unit 200). At a second shift step, $PE_{00}$ can shift the element $I_0$ to $PE_{01}$ of the 1st column in the 0th row and read or receive another element $I_1$. At each shift step, an element of vector I (e.g., element $I_0$) can be shifted into a next PE 202 (e.g., $PE_{0j}$) of PE array 220. In this way, vector I can be shifted into and distributed in or shifted through PEs 202 in the 0th row of PE array 220. In some embodiments, after each shift step, a round of one or more operations can be performed by PE 202 on shifted data. In some embodiments, the number h of elements in the vector I is less than n, and the elements can be distributed among or shifted through a part of a row of PEs 202.

In the z direction, data from memory interface 204 can be distributed (e.g., broadcasted or multicasted) among PEs 202 of PE array 220. For example, a column of PEs 202, e.g., $PE_{02}$, $PE_{12}$, $PE_{22}$, ..., $PE_{i2}$, ..., $PE_{m2}$, can be connected in parallel with memory interface 204 via connection 203. Data (e.g., an element of a vector f ($f_0$, $f_1$, ..., $f_k$)) can be broadcasted to the column of PEs 202. Different elements of the vector f can be broadcasted to different columns of PEs 202. Then, after broadcast, the vector can be distributed to each row of the PE array 202. In some embodiments, the number k of elements in the vector is less than n, and the elements of the vector can be distributed among a part of a row of PEs 202.

As shown in FIG. 2, data (e.g., a vector) can be either shifted into a row of the PE array 220 or broadcasted (or multicasted) into the row of the PE array 220. Processing unit 200 can switch input manner of PE array 220 between shift via connection 201 and broadcast or multicast via connection 203. In operation, when PEs 202 of PE array 220 operate on data shifted in, the data for next-round operation can be broadcasted or multicasted into PE array 220. This can significantly reduce communication latency and improve overall performance of processing unit 200.

Reduce tree unit 206 can be arranged along x direction (row-wise manner) or y direction (column-wise manner). In some embodiments, reduce tree unit 206 can be arranged along both x direction (row-wise manner) and y direction (column-wise manner) and configured to switch between the x direction and the y direction. For example, in row-wise manner as shown in FIG. 2, each reduce tree unit 206 can be coupled with a row of PEs 202 in PE array 220. In general, a reduce tree unit 206-$i$ can be coupled with the i-th row of PEs 202. Processing unit 200 can include a plurality of reduce tree units 206-0, 206-1, 206-2, . . . , 206-$i$, . . . , 206-$m$. Reduce tree unit 206 can support a set of logical and arithmetic reduction operators, such as ADD, MIN, MAX, AND, OR, XOR, bit concatenation (Bit-Concat), or the like. For example, reduce tree unit 206-$i$ can perform ADD, MIN, MAX, or other operations on output data from PEs 202 in the i-th row of PE array 220 and provide reduction output data 205.

In some embodiments, processing unit 200 can also include a flex-reduce tree unit 208 or an accumulator 210, as shown in FIG. 2. Flex-reduce tree unit 208 can support a set of logical and arithmetic reduction operators, such as ADD, MIN, MAX, configurable output depth, find, or the like. Accumulator 210 can perform accumulation on received data. Flex-reduce tree unit 208 or accumulator 210 can be coupled to one or more reduce tree units 206. Then, flex-reduce tree unit 208 or accumulator 210 can perform further reduction operations (e.g., ADD, MIN, MAX, configurable output depth, find, accumulation, or the like) on reduction output data 205 from reduce tree units 206 and provide reduction output data 207.

In some embodiments, processing unit 200 can include a controller (not shown in FIG. 2). The controller can be coupled with one or more components (e.g., PEs 202 of PE array 220, memory interface 204, reduce tree units 206, flex-reduce tree unit 208, or accumulator 210 of FIG. 2, the local memory of processing unit 200, or the like) of processing unit 200 (e.g., via the control bus), and monitor, control, or coordinate (e.g. by using instructions) the operations of various coupled components. Alternatively, processing unit 200 does not include a local controller and can be controlled by an external controller (e.g., host unit 120 of FIG. 1A). For example, processing unit 200 can receive instructions from the external controller, and distribute the instructions to various components (e.g., via the control bus) for execution.

In some embodiments, the components of processing unit 200 can perform operations by execution of various instructions. For example, instructions for PEs 202 can include, but is not limited to, MUL instruction, ADD instruction, SUB instruction, SAD instruction, ABS instruction, SHIFT instruction, LOGICAL instruction, MOV instruction, and the like. The SHIFT instruction can include loading data and x-direct shifting in. Instructions for reduce tree units 206 can include, but is not limited to, ADD instruction, AND instruction, OR instruction, XOR instruction, MIN instruction, MAX instruction, Bit-Concat instruction, and the like. Instructions for flex-reduce tree unit 208 can include, but is not limited to, Find( ) return indices, MIN/MAX( ) return indices, Configurable output depth, and the like.

It is appreciated that processing unit 200 can implement multiple types of processing, including, but not being limited to, transcoding (e.g., video transcoding), ML or DL, video analytics, database, bioinformatics, or the like. Different types of processing (e.g., video transcoding and DL) can be performed in same processing unit 200 or distributed among a plurality of processing units 200. In some embodiments, different types of processing can be performed in parallel by the plurality of PEs 202 in processing unit 200 or by a plurality of processing units 200. For example, in processing unit 200, some PEs 202 can execute video transcoding instructions while other PEs 202 can perform instructions for execution of a neural network. The video transcoding burden and ML/DL burden can be balanced and dynamically mapped on a plurality of processing unit 200 or a plurality of PEs 202. Communication of data among processing units 200 or PEs 202 can be very fast. Therefore, some embodiments of the present application can reduce latency for communication and speed up various processing or combination of different processing.

FIG. 3 illustrates a schematic diagram of exemplary PE 310 and PE 320, according to some embodiments of the present disclosure. PE 310 or PE 320 can be implemented as PE 202 of FIG. 2. As shown in FIG. 3, PE 310 can include an operation unit (OU) 311, a plurality of registers (e.g., register Rx 312, register Rz 313, register Ro 314, and register Rp 315), and a plurality of inputs (or input terminals, e.g., input INx 317, input INz 318, and input INc 319). Similarly, PE 320 can include an operation unit (OU) 321, a plurality of registers (e.g., register Rx 322, register Rz 323, register Ro 324, and register Rp 325), and a plurality of inputs (or input terminals, e.g., input INx 327, input INz 328, and input INc 329).

The plurality of registers can include an input register Rx 312, an input register Rz 313, and an output register Ro 314. Input registers Rx 312, Rz 313, and output register Ro 314 can be architectural registers that are software-visible. Input register Rx 312 can be connected with input INx 317 to load and store input data (e.g., an element of a vector or matrix) from memory interface (e.g., memory interface 204 of FIG. 2) or local memory along x direction of FIG. 2, while input register Rz 313 can be connected with input INz 318 to load and store input data from memory interface or local memory along z direction of FIG. 2. In some embodiments, input INx 317 can be connected to an input register of previous PE (not shown), and the data can be shifted into input register Rx 312 via input INx 317 from the input register of the previous PE. Input register Rx 312 can be connected to input INx 327 of PE 320. Data in input register Rx 312 can be shifted to input register Rx 322 of PE 320 via input INx 327. In some embodiments, the data can be broadcasted or multicasted into input register Rz 313 via input INz 318. Output register Ro 314 can store output data from operation unit 311.

In some embodiments, PE 310 can also include a predicate register Rp 315 that can store predicate data and support predicate operations. For example, predicate register Rp 315 can store a flag for predicate operations. When the flag in predicate register Rp 315 is set to one, an operation in PE 310 can be performed. When the flag in predicate register Rp 315 is set to zero, an operation in PE 310 can be ignored and not performed. In some embodiments, the flag in predicate register Rp 315 can be configured via an instruction.

Operation unit 311 can be coupled to the plurality of registers, such as input register Rx 312, input register Rz 313, output register Ro 314, and predicate register Rp 315. Operation unit 311 can be configured to perform an operation on received data (e.g., elements of a matrix or vector) in input registers Rx 312 and Rz 313 and store the result of the operation in output register Ro 314. Operation unit 311 can support a plurality of logical and arithmetic operators, such as MUL, ADD, MAC, SUB, SAD, ABS, shift, logical operators, MOV, or the like. In some embodiment, operation unit 311 can include SIMD architecture and operate on the same instruction stream received from control bus 330 via control input INc 319. Control bus 330 can be connected to operation unit 311 to provide instructions for execution.

Although illustrated as a single operation unit 311, it is appreciated that PE 310 can include a plurality of operation units 311.

In some embodiments, PE 310 can also include a memory 316. Memory 316 can store pre-fetched data (e.g., an operand). For example, during neural network execution in ML or DL, memory 316 can store a constant or one or more pre-fetched elements of a weight matrix. The pre-fetched data can be shifted into, broadcasted or multicasted to memory 316. Memory 316 can be coupled with operation unit 311 that read data from memory 316 and perform operations on the data. Alternatively, memory 316 can be coupled with input register (e.g., input register Rx 312 or Rz 313). During an operation, data can be loaded from memory 316 to input register for processing by operation unit 311. Memory 316 can be configured and controlled via instructions (e.g., instruction for loading an operand from memory 316). In some embodiments, memory 316 can be scratch memory, such as scratch SRAM.

It is appreciated that PE 320 can includes similar components as those of PE 310. PE 310 and PE 320 can implement multiple types of processing, including, but not being limited to, transcoding (e.g., video transcoding), ML or DL, video analytics, database, bioinformatics, or the like.

Figure 4:
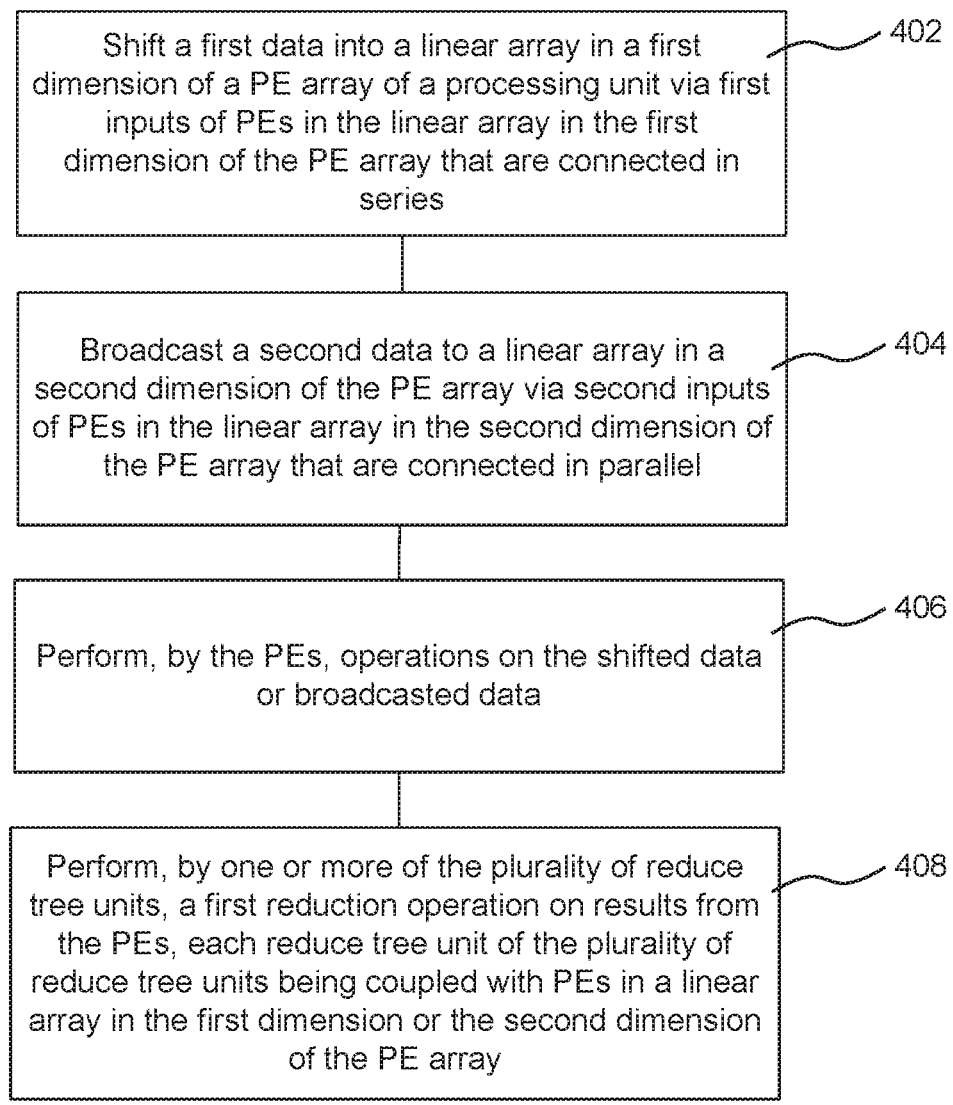
FIG. 4 illustrates a flowchart of an exemplary map reduce method, according to some embodiments of the present disclosure.

FIG. 4 illustrates a flowchart of an exemplary map reduce method 400, according to some embodiments of the present disclosure. Method 400 can be implemented by core 102 of FIG. 1A, processing unit 200 of FIG. 2, or the like. Moreover, method 400 can also be implemented by a computer program product, embodied in a computer-readable medium, including computer-executable instructions, such as program code, executed by computers. In some embodiments, a compiler or a host unit (e.g., host unit 120 of FIG. 1A or 1B) may compile software code to generate instructions for execution by a processing unit (e.g., core 102 of FIG. 1A, processing unit 200 of FIG. 2, or the like) to perform method 400.

At step 402, the compiler or host unit can configure the processing unit to shift a first data into a linear array or tuple in a first dimension (e.g., x direction of FIG. 2) of a PE array (e.g., PE array 220 of FIG. 2, PE array 520 of FIG. 5, PE array 620 of FIG. 6, or PE array 720 of FIG. 7) of a processing unit (e.g., processing unit 200 of FIG. 2). The first data can be shifted via first inputs (e.g., data inputs $IN_{ijx}$ in x direction of FIG. 2) of PEs (e.g., PE 202 of FIG. 2, PE 310 or 320 of FIG. 3, PE 502 of FIG. 5, PE 602 of FIG. 6, or PE 702 of FIG. 7) in the first dimension of PE array. The first inputs of PEs in the first dimension of PE array can be connected in series. For example, referring to FIG. 2, processing unit 200 can shift a vector I ($I_0$, $I_1$, ..., $I_h$) with h elements into a row (e.g., 0th row) of PE array 220 step by step. At each shift step, an element of vector I (e.g., element $I_0$) can be shifted from a previous PE 202 (e.g., $PE_{0(j-1)}$) into a next PE 202 (e.g., $PE_{0j}$) of PE array 220 via data inputs $IN_{ijx}$ in x direction.

At step 404, the compiler or host unit can configure the processing unit to broadcast a second data to a linear array or tuple in a second dimension (e.g., y direction of FIG. 2) of the PE array. The second data can be broadcasted via second inputs (e.g., data inputs $IN_{ijz}$ in z direction of FIG. 2) of PEs in the second dimension of PE array. The second inputs of PEs in the second dimension of PE array can be connected in parallel. For example, referring to FIG. 2, processing unit 200 can broadcast an element of vector f ($f_0$, $f_1$, ..., $f_k$) with k element to a corresponding column of PE array 220 via data inputs $IN_{ijz}$ in z direction. For example, processing unit 200 can broadcast element $f_0$ to 0th column of PEs 202 in PE array 220, including $PE_{00}$, $PE_{10}$, $PE_{20}$, $PE_{m0}$, element $f_1$ to 1st column of PEs 202 in PE array 220, and so on.

In some embodiments, the compiler or host unit can configure the processing unit to, during broadcast of the second data, shift a third data for next-round operations into the linear array in the first dimension of the PE array of the processing unit via first inputs of PEs in the linear array in the first dimension of the PE array.

In some embodiments, the compiler or host unit can configure the processing unit to, during the shift of the first data, broadcast a fourth data for next-round operations to the linear array in the second dimension of the PE array via second inputs of PEs in the linear array in the second dimension of the PE array.

At step 406, the compiler or host unit can configure one or more PEs of the processing unit to perform an operation on the shifted data or broadcasted data. The operation can include at least one of MUL operation, ADD operation, SUB operation, SAD operation, ABS operation, shift operation, logical operation, and MOV operation. The operation can be performed by PE 202 of FIG. 2, PE 310 or PE 320 of FIG. 3 (specifically, operation unit 311 or 321 of FIG. 3), PE 502 of FIG. 5, PE 602 of FIG. 6, or PE 702 of FIG. 7.

Optionally, at step 408, the compiler or host unit can configure one or more of the plurality of reduce tree units (e.g., reduce tree unit 206 of FIG. 2) of the processing unit to perform a first reduction operation on results from the PEs. The reduce tree unit can be coupled with PEs in a linear array in the first dimension or the second dimension of the PE array. The first reduction operation can include at least one of ADD operation, MIN operation, MAX operation, AND operation, OR operation, XOR operation, and Bit-Concat operation.

In some embodiments, the compiler or host unit can also configure a flex-reduce tree unit or an accumulator of the processing unit (e.g., flex-reduce tree unit 208 or accumulator 210 of FIG. 2) of the processing unit to perform a second reduction operation on a result of the first reduction operation. The second reduction operation includes at least one of ADD operation, MIN operation, MAX operation, configurable output depth operation, find operation, and accumulation operation.

Figure 5:
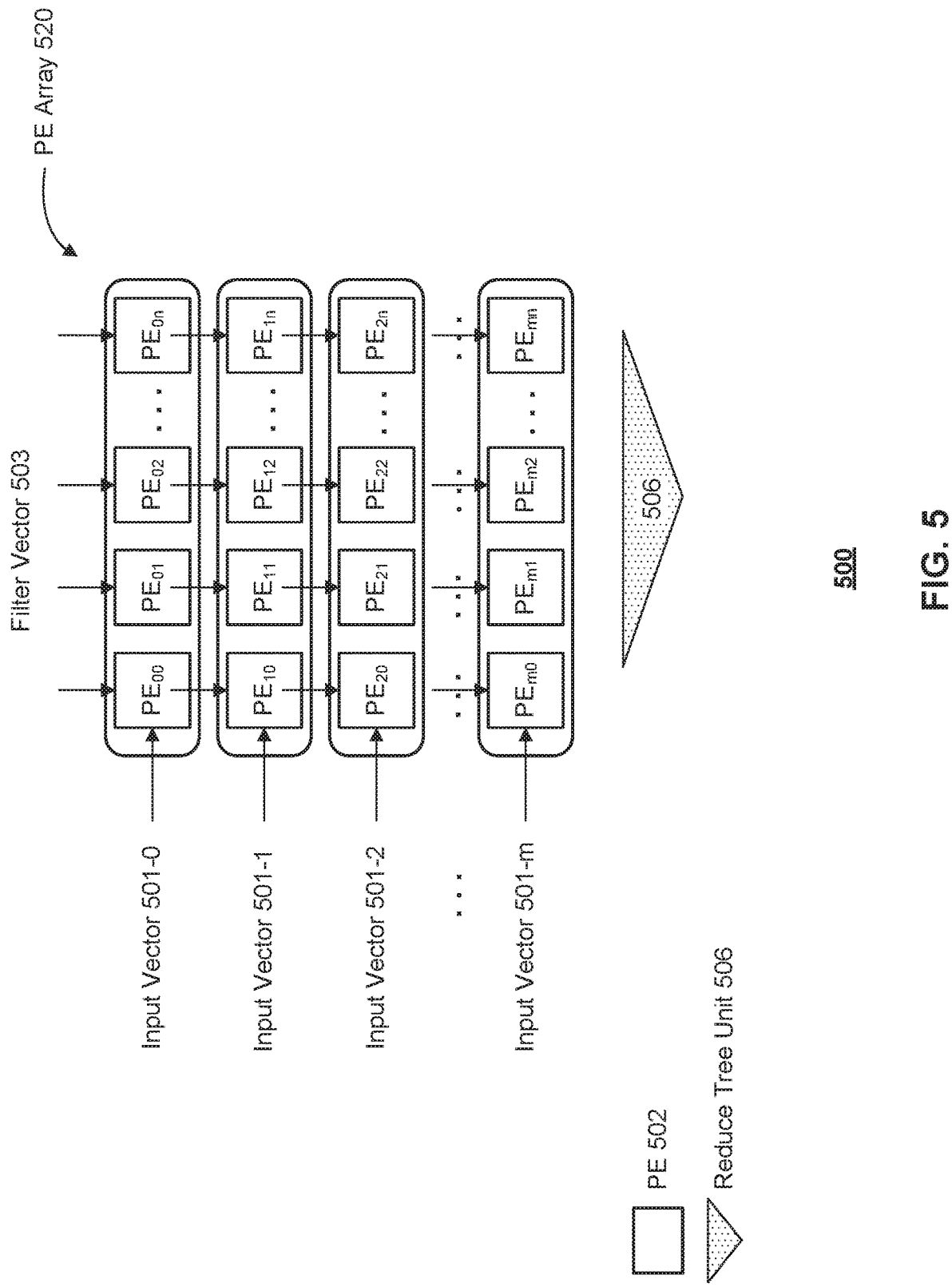
FIG. 5 illustrates a schematic diagram of an exemplary 1-dimensional (1D) convolution, according to some embodiments of the present disclosure.

FIG. 5 illustrates a schematic diagram of an exemplary 1D convolution 500, according to some embodiments of the present disclosure. It is appreciated that 1D convolution 500 can be implemented by processing unit 200 of FIG. 2.

1D convolution can be used in many applications, such as ML or DL, text or audio transcoding, or the like. During transcoding, for example, the 1D convolution of an input vector I ($I_0$, $I_1$, ..., $I_h$) and a filter vector (or kernel vector) f ($f_0$, $f_1$, ..., $f_k$) can be calculated as following, $$(I * f)[i] \stackrel{def}{=} \sum_{j=-\infty}^{\infty} I[j] \cdot f[i-j]$$

where i and j are integers.

As shown in FIG. 5, filter vector 503 $f$ ($f_0$, $f_1$, ..., $f_k$) can be distributed into PE array 520. For example, an element of filter vector 503 can be broadcasted into a column of PE array 520. After broadcast, filter vector 503 is stored on each row of PE array 520, such as the 0th row of PE array 520, including $PE_{00}$, $PE_{01}$, $PE_{02}$, ..., $PE_{0k}$. For example, element $f_k$ can be broadcasted to the k-th column of PE array 520, $PE_{0k}$, $PE_{1k}$, $PE_{2k}$, ..., $PE_{mk}$. Each PE 502 in the k-th column of PE array 520 can store element $f_k$ in its input register (e.g., register Rz 313 or 323 of FIG. 3). When k<n, the filter vector can be broadcasted to a part of PE array 520. In some embodiments, during processing, filter vector 503 can remain stationary in PE array 520.

Input vector 501 (e.g., input vectors 501-0, 501-1, ..., 501-m) can be input to PE array 520. For example, input vector 501 I ($I_0$, $I_1$, ..., $I_h$) can be shifted into PE array 520 step by step from the 0th column. After each shift step, a round of operations can be performed. Specifically, a PE 502 can multiply an element of input vector 501 shifted in and a broadcasted element of filter vector 503. Reduce tree unit 506 can add the results of multiplications in a corresponding row of PEs 502. For example, input vector 501-0 I ($I_0$, $I_1$, ..., $I_h$) can be shifted into the 0th row of PE array 520. At the first shift step, element $I_0$ can be shifted into an input register (e.g., register Rx 312 or 322 of FIG. 3) of $PE_{00}$. $PE_{00}$ can multiply element $I_0$ of the input vector 501-0 with element $f_0$ of the filter vector 503 in another input register (e.g., register Rz 313 or 323 of FIG. 3). Since there is only one multiplication, reduce tree unit 506 can output the result $I_0*f_0$ as the 0th element of the convolution result. At the second shift step, element $I_0$ can be shifted into $PE_{01}$ and element $I_1$ can be shifted into the input register of $PE_{00}$. $PE_{00}$ can multiply element $I_1$ of the input vector 501-0 with element $f_0$ of the filter vector 503. $PE_{01}$ can multiply element $I_0$ of the input vector 501-0 with element $f_1$ of the filter vector 503. Reduce tree unit 506 can add the results of multiplications and output the result ($I_1*f_0+I_0*f_1$) as the 1st element of the convolution result. In this way, input vector 501-0 can be shifted through filter vector 503. Reduce tree unit 506 can output the convolution result, e.g., a convolution vector. In some embodiments, PE array 520 can process 1D convolutions of filter vector 503 with a plurality of vectors, e.g., input vectors 501-0, 501-1, ..., 501-m, in parallel, as shown in FIG. 5.

In some embodiments, during shift of the input vector 501, filter vector 503 for next-round operations can be broadcasted to PE array 520. Therefore, broadcast of next-round filter vector can be in parallel with shift and processing of current-round input vector 501. This parallelization can improve efficiency and performance of the PE array 520.

It is appreciated that PE array 520 can also perform a 2-dimensional (2D) convolution of two matrices, such as an image matrix and a filter matrix (or kernel matrix) in video transcoding.

Figure 6:
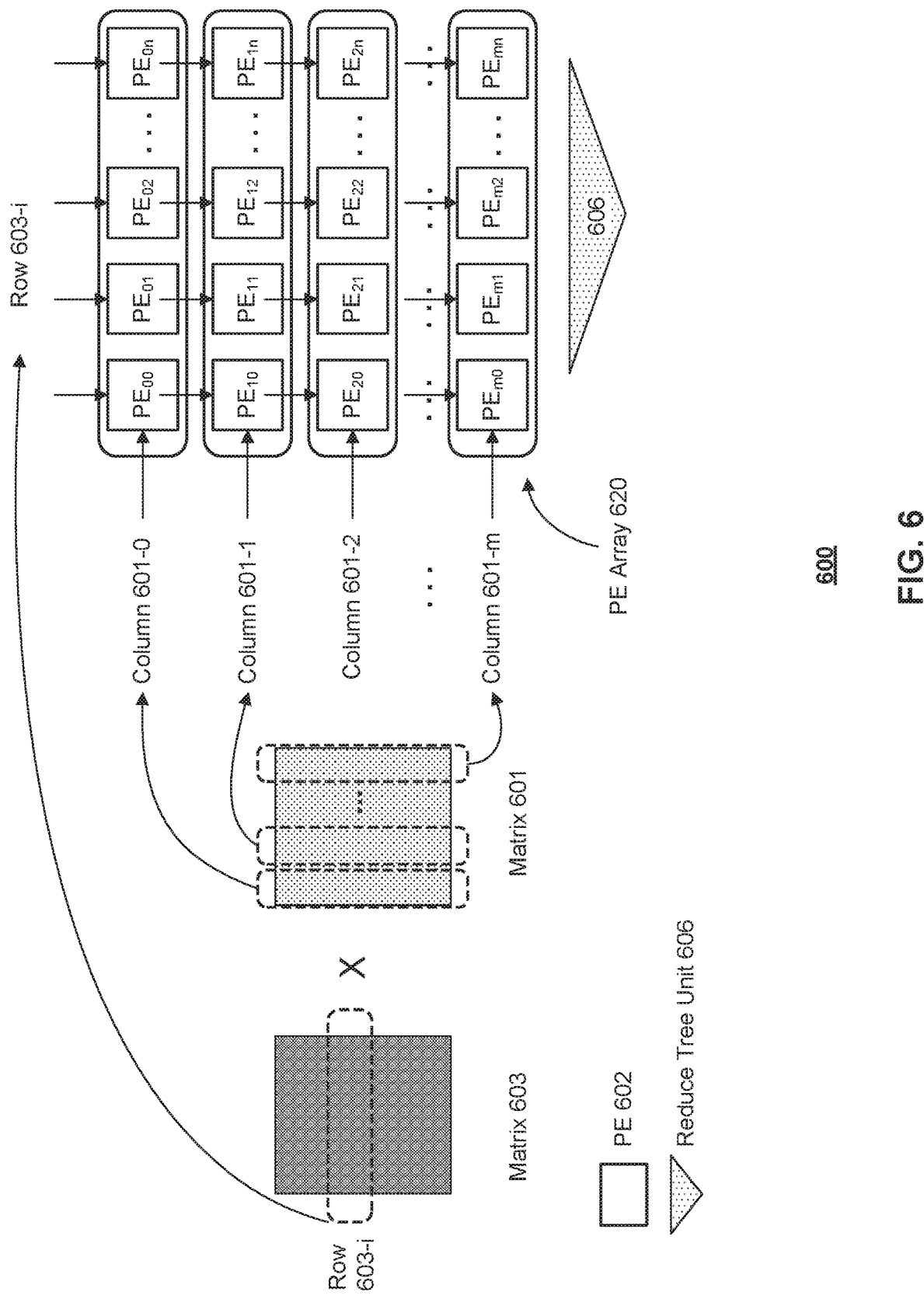
FIG. 6 illustrates a schematic diagram of an exemplary matrix multiplication, according to some embodiments of the present disclosure.

FIG. 6 illustrates a schematic diagram of an exemplary matrix multiplication 600, according to some embodiments of the present disclosure. It is appreciated that matrix multiplication 600 can be implemented by processing unit 200 of FIG. 2. Matrix multiplication 600 can be used in many applications, such as ML or DL, video transcoding, or the like.

As shown in FIG. 6, matrix 601 is multiplied with matrix 603. Matrix 601 can have a size of h×w. Each column of matrix 601 can be distributed to a corresponding row of PEs 602 in PE array 620. For example, column 601-0, column 601-1, ... column 601-h can be shifted into the 0th, 1th, ..., h-th row of PEs 602 in PE array 620. Each PE 602 in these rows can store the element of matrix 601 in its input register (e.g., register Rx 312 or 322 of FIG. 3). Although shown as being equal to m, h can be less than m, in which case, a part of PE array 620 can be used to perform the matrix multiplication. During the matrix multiplication, matrix 601 can remain stationary in PE array 620.

Matrix 603 can have a size of w×h. A row of matrix 603 can be distributed to a row of PEs 602 in PE array 620. For example, row 603-i of matrix 603 can be broad casted into the 0th, 1th, ..., h-th rows of PE array 620. Specifically, each element of row 603-i can be broadcasted into a corresponding column of PE array 620. After broadcast, row 603-i is stored on each row of PE array 620, such as the 0th row of PE array 620, including $PE_{00}$, $PE_{01}$, $PE_{02}$, ..., $PE_{0h}$. Each PE 602 in these rows can store the element of row 603-i in its input register (e.g., register Rz 313 or 323 of FIG. 3). When h<n, a row of matrix 603 can be broadcasted to a part of PE array 620.

In some embodiments, during broadcast of rows of current-round matrix 603, matrix 601 for next-round operations can be shifted into PE array 620. Therefore, shift of next-round matrix 601 can be in parallel with broadcast and processing of rows of current-round matrix 603, which can improve efficiency and performance of the PE array 620.

PEs 602 in PE array 620 can multiply the element of matrix 601 with the element of matrix 603. Reduce tree units 606 can add results of the multiplications in corresponding rows of PE array 620 to obtain elements for result matrix. After all rows of matrix 603 are processed, the entire result matrix that is the product of matrix 601 and matrix 603 can be obtained.

Figure 7:
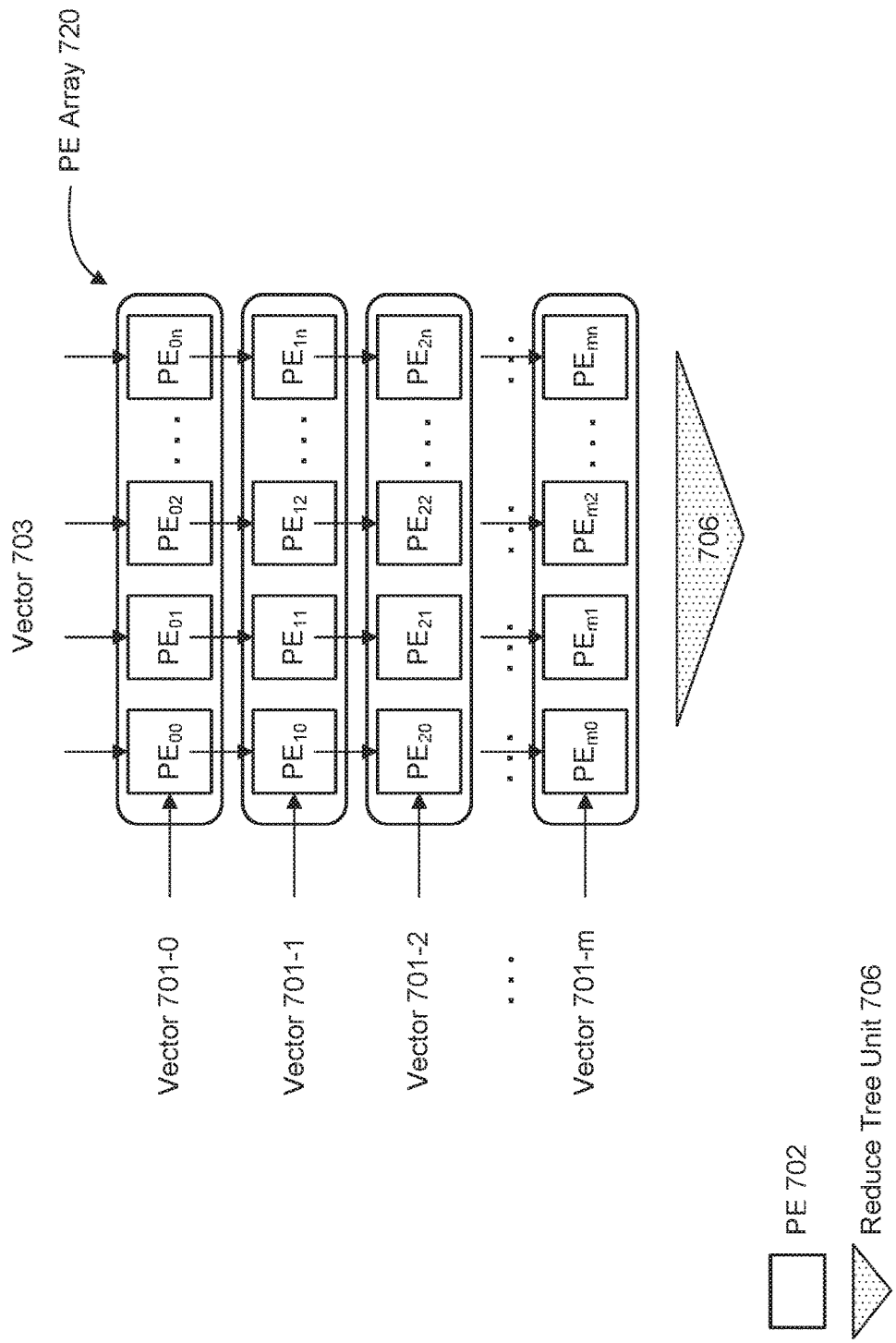
FIG. 7 illustrates a schematic diagram of an exemplary Euclidean distance calculation, according to some embodiments of the present disclosure.

FIG. 7 illustrates a schematic diagram of an exemplary Euclidean distance calculation 700, according to some embodiments of the present disclosure. It is appreciated that Euclidean distance calculation 700 can be implemented by processing unit 200 of FIG. 2. Euclidean distance calculation 700 can be used in many applications, such as video analytics or the like.

Euclidean distance calculation 700 can be performed in a k-dimensional space where a position can be represented by a k-width vector. As shown in FIG. 7, Euclidean distance between a vector 701 (e.g., vector 701-0, vector 701-1, vector 701-2, ..., or vector 701-m) I ($I_0$, $I_1$, ..., $I_k$) and a vector 703 R ($R_0$, $R_1$, ..., $R_k$) can be calculated. Vector 701 and vector 703 can be distributed to a row of PE array 720. For example, vector 701-0 can be shifted into the 0th row of PE array 720. $I_0$ can be shifted in an input register (e.g., register Rx 312 or 322 of FIG. 3) of $PE_{00}$, $I_1$ can be shifted in an input register of $PE_{01}$, and so on. When k<n, vector 701 can be shifted into a part of a row in PE array 720. For vector 703, an element of the vector 703 can be broadcasted into a column of PE array 720. After broadcast, vector 703 is stored on each row of PE array 720, such as the 0th row of PE array, including $PE_{00}$, $PE_{01}$, $PE_{02}$, ..., $PE_{0k}$. For example, element $R_i$ can be broadcasted to the i-th column of PE array 720. Each PE 702 in the i-th column of PE array 720 can store element $R_i$ in its input register (e.g., register Rz 313 or 323 of FIG. 3).

In some embodiments, for each round of operations, there can be a plurality of vectors 703 to be processed with vectors 701. During broadcast of current-round vectors 703, vectors 701 for next-round operations can be shifted into PE array 720. Therefore, shift of next-round vectors 701 can be in parallel with broadcast and processing of current-round vectors 703, which can improve efficiency and performance of the PE array 720.

PE 702 can perform a SUB operation on an element of vector 701 and an element of vector 703, and a MUL operation to obtain a square of the SUB result. Reduce tree unit 602 can perform an ADD operation on squares from a corresponding row of PEs 702 in PE array to calculate the Euclidean distance.

In some embodiments, PE array 720 can calculate Euclidean distances of vector 703 from a plurality of vectors, e.g., vectors 701-0, 701-1, . . . , 701-m, in parallel, as shown in FIG. 7.

In some embodiments, a processing unit (e.g., processing unit 200 of FIG. 2) or processing element (e.g., PE 202 of FIG. 2, PE 310 or 320 of FIG. 3, PE 502 of FIG. 5, PE 602 of FIG. 6, or PE 702 of FIG. 7) can implement multiple types of processing, including, but not being limited to, transcoding (e.g., video transcoding), ML or DL, video analytics, database, bioinformatics, or the like. In some embodiments, the processing unit or processing element can also allow efficient switching among different types of processing and thus achieve low-latency and high-performance processing.

Figure 8:
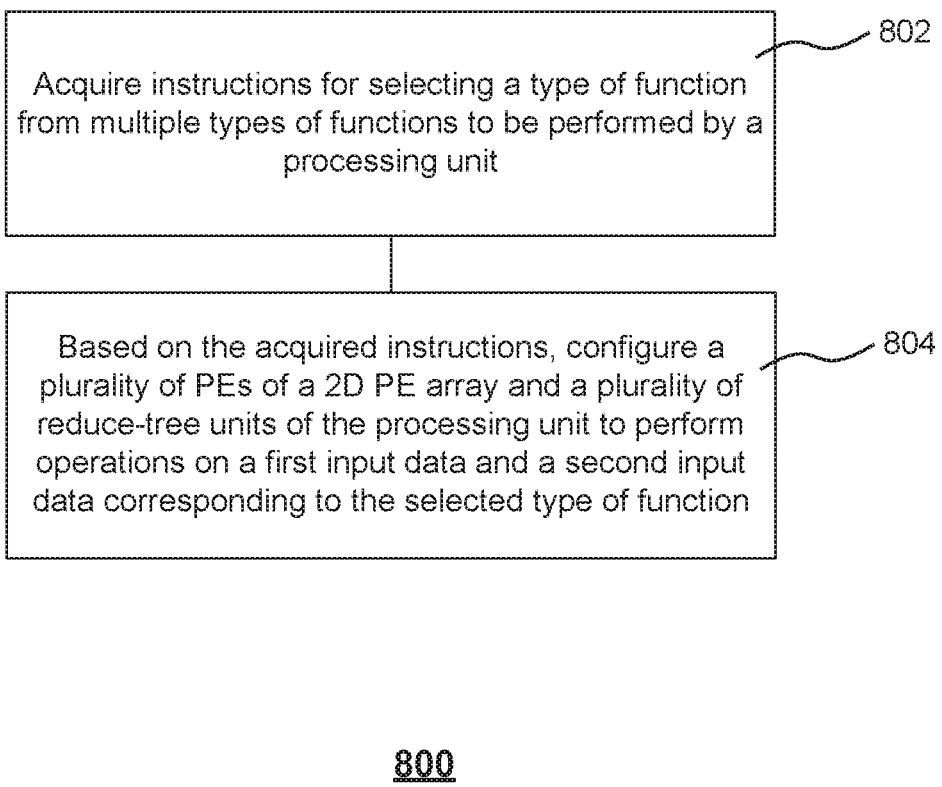
FIG. 8 illustrates a flowchart of an exemplary method for configuring a processing unit, according to some embodiments of the present disclosure.

FIG. 8 illustrates a flowchart of an exemplary method 800 for configuring a processing unit, according to some embodiments of the present disclosure. Method 800 can be implemented by core 102 of FIG. 1A, processing unit 200 of FIG. 2, or the like. Moreover, method 800 can also be implemented by a computer program product, embodied in a computer-readable medium, including computer-executable instructions, such as program code, executed by computers. In some embodiments, a compiler or a host unit (e.g., host unit 120 of FIG. 1A or 1B) may compile software code to generate instructions for execution by a processing unit (e.g., core 102 of FIG. 1A, processing unit 200 of FIG. 2, or the like) to perform method 800.

At step 802, the processing unit (e.g., core 102 of FIG. 1A, processing unit 200 of FIG. 2, or the like) can acquire instructions for selecting a type of function from multiple types of functions to be performed by the processing unit. The multiple type of functions can include a 1-dimensional (1D) convolution, a 2D convolution, a SAD, a matrix multiplication, a Euclidean distance, a string match, a weighted Hamming distance, or the like. The multiple type of function can be applied to transcoding (e.g., video transcoding), ML or DL, video analytics, database, bioinformatics, or the like. The processing unit can include a 2D PE array (e.g., PE array 220 of FIG. 2, PE array 520 of FIG. 5, PE array 620 of FIG. 6, or PE array 720 of FIG. 7) and a plurality of reduce-tree units (e.g., reduce-tree unit 206 of FIG. 2, reduce-tree unit 506 of FIG. 5, reduce-tree unit 606 of FIG. 6, reduce-tree unit 706 of FIG. 7).

At step 804, the processing unit can configure, based on the acquired instructions, a plurality of PEs of the 2D PE array to perform operations on a first input data and a second input data corresponding to the selected type of function. For example, the plurality of PEs can be configured to shift the first input data into a first linear array of PEs in a first dimension (e.g., x direction of FIG. 2) of the 2D PE array and broadcast the second input data into a second linear array of PEs in a second dimension (e.g., y direction of FIG. 2) of the 2D PE array. If a first type of function is selected, the plurality of PEs can be configured to maintain the first input data during broadcast of the second data for performing operations corresponding to the first type of function. If a second type of function is selected, the plurality of PEs can be configured to maintain the second input data during shift of the first data for performing operations corresponding to the second type of function.

In some embodiments, if the first type of function is selected, the plurality of PEs can be configured to shift a third input data for next-round operations into the first linear array of PEs during broadcast of the second data. Therefore, for the first type of function, shift of next-round input data (e.g., the third input data) can be in parallel with broadcast of current-round input data (e.g., the second data).

In some embodiments, if the second type of function is selected, the plurality of PEs are configured to broadcast a fourth input data for next-round operations into the second linear array of PEs during shift of the first data. Therefore, for the second type of function, broadcast of next-round input data (e.g., the fourth input data) can be in parallel with shift of current-round input data (e.g., the first input data).

The plurality of PEs can be further configured to perform operations on the first input data and the second input data. One or more of the plurality of reduce tree units can be configured to perform first reduction operations on results from the first linear array of PEs or the second linear array of PEs. In some embodiments, the first input data can be shifted via first inputs (e.g., data inputs $IN_{ijx}$ in x direction of FIG. 2) of the first linear array of PEs. The first inputs of the first linear array of PEs can be connected in series. Moreover, the second input data can be broadcasted via second inputs (e.g., data inputs $IN_{ijz}$ in z direction of FIG. 2) of the second linear array of PEs. The second inputs of the second linear array of PEs can be connected in parallel.

In some embodiments, the selected second type of function can be 1D convolution (e.g., 1D convolution of FIG. 5). The operation performed by a PE of the plurality of PEs can include a MUL operation on the first and second input data. The first reduction operation can include an ADD operation on results from the first or second linear array of PEs. Method 800 can configure the processing unit to perform transcoding (e.g., video transcoding). For example, in video transcoding, the first input data can be a video image while the second input data can be a filter vector.

In some embodiments, the selected second type of function can be 2D convolution. The operation performed by a PE of the plurality of PEs includes a MUL operation on the first and second input data. The first reduction operation includes an ADD operation on results from the first or second linear array of PEs. The processing unit can also configure, based on the acquired instructions, a flex-reduce tree unit (e.g., flex-reduce tree unit 208 of FIG. 2) of the processing unit to perform an ADD operation on results of the first reduction operations. Method 800 can configure the processing unit to perform transcoding (e.g., video transcoding) or DNN execution. For example, in video transcoding, the first input data can be a video image matrix while the second input data can be a filter matrix.

In some embodiments, the selected second type of function can be SAD. The operation performed by a PE of the plurality of PEs can include a SUB operation on the first and second input data and a MUL operation on a result of the SUB operation. The first reduction operation can include an ADD operation on results from the first or second linear array of PEs. The processing unit can also configure, based on the acquired instructions, the flex-reduce tree unit of the processing unit to perform an ADD operation on results of the first reduction operations. Method 800 can configure the processing unit to perform transcoding (e.g., video transcoding) or DNN execution. For example, in video transcoding, the first input data can be a video image matrix while the second input data can be a filter matrix.

In some embodiments, the selected first type of function can be matrix multiplication (e.g., matrix multiplication 600 of FIG. 6). The operation performed by a PE of the plurality of PEs can include a MUL operation on the first and second input data. The first reduction operation includes an ADD operation on results from the first or second linear array of PEs. Method 800 can configure the processing unit to perform DNN execution. For example, the first input data can be an image matrix while the second input data can be a weight matrix of the DNN.

In some embodiments, the selected first type of function can be Euclidean distance (e.g., Euclidean distance 700 of FIG. 7). The operation performed by a PE of the plurality of PEs includes a SUB operation on the first and second input data and a MUL operation on a result of the SUB operation. The first reduction operation can include an ADD operation on results from the first or second linear array of PEs. Method 800 can configure the processing unit to be applied to video analytics.

In some embodiments, the selected second type of function can be string match. The operation performed by a PE of the plurality of PEs can include a compare operation on the first and second input data based on predication of a flag register of the PE. The processing unit can configure the flag register. If the flag register indicates that the operation is ignored (e.g., the flag register is set to zero), the PE does not perform the compare operation. The first reduction operation can include a Bit-Concat operation on results from the first or second linear array of PEs. The processing unit can also configure, based on the acquired instructions, the flex-reduce tree unit of the processing unit to perform a find operation on results of the first reduction operations. Method 800 can configure the processing unit to be applied to database. For example, the first input data can be a character string while the second input data can be a filter pattern.

In some embodiments, the selected first type of function can be weighted Hamming distance. The operation performed by a PE of the plurality of PEs can include a compare operation on the first and second input data and an ADD operation based on predication of a flag register of the PE. The processing unit can configure the flag register. If the flag register indicates that the operation is ignored (e.g., the flag register is set to zero), the PE does not perform the ADD operation. In some embodiments, the PE is further configured to load a third input data from a scratch memory (e.g., memory 316 or 326 of FIG. 3) of the PE for the ADD operation. The third input data can be pre-fetched into the scratch memory. The first reduction operation can include an ADD operation on results from the first or second linear array of PEs. The processing unit can also configure, based on the acquired instructions, the flex-reduce tree unit of the processing unit to perform a MIN operation on results of the first reduction operations. Method 800 can configure the processing unit to be applied to Bioinformatics. For example, the first input data can be an array of reads, the second input data can be an array of consensuses, and the third input data can be quality scores.

Some embodiments of the present disclosure allow fast algorithm-to-market, algorithm customization, runtime adaptive optimization, or quick adaption for future formats.

Some embodiments of the present disclosure can combine different types of processing. For example, in some embodiments, in-place ML/DL acceleration with video transcoding can be allowed. Some embodiments can enable ML/DL-assist video transcoding algorithm, codec-assisted ML/DL applications, or the like.

Embodiments of the present disclosure can be applied to many products, environments, and scenarios. For example, some embodiments of the present disclosure can be applied to a processor (such as CPU), Ali-NPU (e.g., Hanguang NPU), Ali-Cloud, Ali PIM-AI (Processor-in Memory for AI), Ali-DPU (Database Acceleration Unit), Ali-AI platform, GPU, TPU, or the like.

The embodiments may further be described using the following clauses:

1. A processing unit, comprising:
a 2-dimensional (2D) processing element (PE) array comprising a plurality of PEs, each PE comprising a first input and a second input, the first inputs of the PEs in a first linear array in a first dimension of the PE array being connected in series and the second inputs of the PEs in a second linear array in a second dimension of the PE array being connected in parallel, each PE being configured to perform an operation on data from the first input or second input; and
a plurality of reduce tree units, each reduce tree unit being coupled with the PEs in a linear array in the first dimension or the second dimension of the PE array and configured to perform a first reduction operation.

2. The processing unit of clause 1, further comprising:
a memory interface connected with a first PE in each linear array in the first dimension of the PE array and the PEs in each linear array in the second dimension of the PE array and configured to provide data to the PE array.

3. The processing unit of clause 1, further comprising:
a local memory connected with a first PE in each linear array in the first dimension of the PE array and the PEs in each linear array in the second dimension of the PE array and configured to store data for the PE array.

4. The processing unit of any of clauses 1-3, wherein the first reduction operation comprises at least one of addition (ADD) operation, MIN operation, MAX operation, AND operation, OR operation, XOR operation, and bit concatenation (Bit-Concat) operation.

5. The processing unit of any of clauses 1-4, further comprising:
a flex-reduce tree unit or an accumulator coupled with the plurality of reduce tree units and configured to perform a second reduction operation.

6. The processing unit of clause 5, wherein the second reduction operation comprises at least one of addition (ADD) operation, MIN operation, MAX operation, configurable output depth operation, and find operation.

7. The processing unit of any of clauses 1-6, further comprising:
a control bus coupled with the plurality of PEs and configured to convey instructions.

8. The processing unit of any of clauses 1-7, wherein each PE comprises:
a first register coupled to the first input and for storing data received via the first input;
a second register coupled to the second input and for storing data received via the second input;
one or more operation units coupled with the first register and the second register and configured to perform an operation on data from the first register or the second register.

9. The processing unit of clause 8, wherein each PE further comprises:
a predicate register coupled with the one or more operation units and configured to indicate whether to ignore the operation of the one or more operation units.

10. The processing unit of any of clauses 8 and 9, wherein each PE further comprises: a scratch memory coupled with the one or more operation units and for storing pre-fetched data.

11. The processing unit of any of clauses 1-10, wherein the PE is configured to perform at least one of multiplication (MUL) operation, addition (ADD) operation, subtraction (SUB) operation, sum of absolute difference (SAD) operation, absolute value (ABS) operation, shift operation, logical operation, and move (MOV) operation.

12. A processing system, comprising:
a host unit configured to provide instructions; and
a processing unit comprising:
  a 2-dimensional (2D) processing element (PE) array comprising a plurality of PEs, each PE comprising a first input and a second input, the first inputs of the PEs in a first linear array in a first dimension of the PE array being connected in series and the second inputs of the PEs in a second linear array in a second dimension of the PE array being connected in parallel, each PE being configured to perform an operation on data from the first input or second input; and
  a plurality of reduce tree units, each reduce tree unit being coupled with the PEs in a linear array in the first dimension or the second dimension of the PE array and configured to perform a first reduction operation,
wherein the processing unit is configured to receive the instructions from the host unit for configuring the PE array and the plurality of reduce tree units.

13. The processing system of clauses 12, further comprising:
a flex-reduce tree unit or an accumulator coupled with the plurality of reduce tree units and configured to perform a second reduction operation.

14. A non-transitory computer readable storage medium storing a set of instructions that are executable by one or more processing devices to cause a processing unit comprising a 2-dimensional (2D) processing element (PE) array to perform:
  shifting a first data into a linear array in a first dimension of the PE array of the processing unit via first inputs of PEs in the linear array in the first dimension of the PE array that are connected in series;
  broadcasting a second data to a linear array in a second dimension of the PE array via second inputs of PEs in the linear array in the second dimension of the PE array that are connected in parallel;
  performing, by the PEs, operations on the shifted data or broadcasted data; and
  performing, by one or more of a plurality of reduce tree units of the processing unit, a first reduction operation on results from the PEs, each reduce tree unit of the plurality of reduce tree units being coupled with PEs in a linear array in the first dimension or the second dimension of the PE array.

15. The non-transitory computer readable storage medium of clause 14, wherein the set of instructions are executable by the one or more processing devices to cause the processing unit to perform:
  shifting a third data for next-round operations into the linear array in the first dimension of the PE array of the processing unit via first inputs of PEs in the linear array in the first dimension of the PE array during broadcast of the second data.

16. The non-transitory computer readable storage medium of clause 14, wherein the set of instructions are executable by the one or more processing devices to cause the processing unit to perform:
  broadcasting a fourth data for next-round operations to the linear array in the second dimension of the PE array via second inputs of PEs in the linear array in the second dimension of the PE array during the shift of the first data.

17. The non-transitory computer readable storage medium any of clauses 14-16, wherein the operation performed by a PE includes at least one of multiplication (MUL) operation, addition (ADD) operation, subtraction (SUB) operation, sum of absolute difference (SAD) operation, absolute value (ABS) operation, shift operation, logical operation, and move (MOV) operation.

18. The non-transitory computer readable storage medium of any of clauses 14-17, wherein the first reduction operation includes at least one of addition (ADD) operation, MIN operation, MAX operation, AND operation, OR operation, XOR operation, and bit concatenation (Bit-Concat) operation.

19. The non-transitory computer readable storage medium of any of clauses 14-18, wherein the set of instructions are executable by the one or more processing devices to cause the processing unit to perform:
  performing, by a flex-reduce tree unit or an accumulator of the processing unit, a second reduction operation on a result of the first reduction operation.

20. The non-transitory computer readable storage medium of clause 19, wherein the second reduction operation includes at least one of addition (ADD) operation, MIN operation, MAX operation, configurable output depth operation, find operation, and accumulation operation.

21. A method performed by a processing unit comprising a 2-dimensional (2D) processing element (PE) array, comprising:
  shifting a first data into a linear array in a first dimension of the PE array of the processing unit via first inputs of PEs in the linear array in the first dimension of the PE array that are connected in series;
  broadcasting a second data to a linear array in a second dimension of the PE array via second inputs of PEs in the linear array in the second dimension of the PE array that are connected in parallel;
  performing, by the PEs, operations on the shifted data or broadcasted data; and
  performing, by one or more of a plurality of reduce tree units of the processing unit, a first reduction operation on results from the PEs, each reduce tree unit of the plurality of reduce tree units being coupled with PEs in a linear array in the first dimension or the second dimension of the PE array.

22. The method of clause 21, further comprising:
  shifting a third data for next-round operations into the linear array in the first dimension of the PE array of the processing unit via first inputs of PEs in the linear array in the first dimension of the PE array during broadcast of the second data.

23. The method of clause 21, further comprising:
  broadcasting a fourth data for next-round operations to the linear array in the second dimension of the PE array via second inputs of PEs in the linear array in the second dimension of the PE array during the shift of the first data.

24. The method of any of clauses 21-23, wherein the operation performed by a PE includes at least one of multiplication (MUL) operation, addition (ADD) operation, subtraction (SUB) operation, sum of absolute difference (SAD) operation, absolute value (ABS) operation, shift operation, logical operation, and move (MOV) operation.

25. The method of any of clauses 21-24, wherein the first reduction operation includes at least one of addition (ADD) operation, MIN operation, MAX operation, AND operation, OR operation, XOR operation, and bit concatenation (Bit-Concat) operation.

26. The method of any of clauses 21-25, further comprising:
  performing, by a flex-reduce tree unit or an accumulator of the processing unit, a second reduction operation on a result of the first reduction operation.

27. The method of clause 26, wherein the second reduction operation includes at least one of addition (ADD) operation, MIN operation, MAX operation, configurable output depth operation, find operation, and accumulation operation.

28. A method for configuring a processing unit including a 2-dimensional (2D) processing element (PE) array, the method comprising:
acquiring instructions for selecting a type of function from multiple types of functions to be performed by the processing unit; and
based on the acquired instructions, configuring a plurality of processing elements (PEs) of the 2D PE array and a plurality of reduce tree units to perform operations on a first input data and a second input data corresponding to the selected type of function, wherein:
the plurality of PEs are configured to shift the first input data into a first linear array of PEs in a first dimension of the 2D PE array and broadcast the second input data into a second linear array of PEs in a second dimension of the 2D PE,
in response to a first type of function being selected, the plurality of PEs are configured to maintain the first input data during broadcast of the second data for performing operations corresponding to the first type of function,
in response to a second type of function being selected, the plurality of PEs are configured to maintain the second input data during shift of the first data for performing operations corresponding to the second type of function,
one or more of the plurality of reduce tree units of the processing unit are configured to perform first reduction operations on results from the first linear array of PEs or the second linear array of PEs.

29. The method of clause 28, wherein
in response to the first type of function being selected, the plurality of PEs are configured to shift a third input data for next-round operations into the first linear array of PEs during broadcast of the second data.

30. The method of any of clauses 28 and 29, wherein
in response to the second type of function being selected, the plurality of PEs are configured to broadcast a fourth input data for next-round operations into the second linear array of PEs during shift of the first data.

31. The method of any of clauses 28-30, wherein a flex-reduce tree unit or an accumulator of the processing unit is configured to perform a second reduction operation on results of the first reduction operations.

32. The method of clause 28, wherein the selected second type of function is 1-dimensional (1D) convolution, the operation performed by a PE of the plurality of PEs includes a multiplication (MUL) operation and the first reduction operation includes an addition (ADD) operation.

33. The method of clause 28, wherein the selected second type of function is 2D convolution, the operation performed by a PE of the plurality of PEs includes a multiplication (MUL) operation and the first reduction operation includes an addition (ADD) operation, and wherein a flex-reduce tree unit of the processing unit is configured to perform an ADD operation on results of the first reduction operations.

34. The method of clause 28, wherein the selected second type of function is sum of absolute difference (SAD), the operation performed by a PE of the plurality of PEs includes a subtraction (SUB) operation and a multiplication (MUL) operation and the first reduction operation includes an addition (ADD) operation, and wherein a flex-reduce tree unit of the processing unit is configured to perform an ADD operation on results of the first reduction operations.

35. The method of clause 28, wherein the selected first type of function is matrix multiplication, the operation performed by a PE of the plurality of PEs includes a multiplication (MUL) operation and the first reduction operation includes an addition (ADD) operation.

36. The method of clause 28, wherein the selected first type of function is Euclidean distance, the operation performed by a PE of the plurality of PEs includes a subtraction (SUB) operation and a multiplication (MUL) operation and the first reduction operation includes an addition (ADD) operation.

37. The method of clause 28, wherein the selected second type of function is string match, the operation performed by a PE of the plurality of PEs includes a compare operation based on predication of a flag register of the PE and the first reduction operation includes a bit concatenation (Bit-Concat) operation, and wherein a flex-reduce tree unit of the processing unit is configured to perform a find operation on results of the first reduction operations.

38. The method of clause 28, wherein the selected first type of function is weighted Hamming distance, the operation performed by a PE of the plurality of PEs includes a compare operation and an addition (ADD) operation based on predication of a flag register of the PE and the first reduction operation includes an ADD operation, and wherein a flex-reduce tree unit of the processing unit is configured to perform a MIN operation on results of the first reduction operations.

39. The method of clause 28, wherein the PE is further configured to load a third input data from a scratch memory of the PE for the ADD operation.

The various example embodiments described herein are described in the general context of method steps or processes (e.g., map reduce method 400 of FIG. 4, method 800 for configuring a processing unit of FIG. 8, or the like), which may be implemented in one aspect by a computer program product, embodied in a computer readable medium, including computer-executable instructions, such as program code, executed by computers (e.g., host unit 120 of FIG. 1A) to configure a processing unit (e.g., processing unit 200 of FIG. 2), a PE array (e.g., PE array 220 of FIG. 2, PE array 520 of FIG. 5, PE array 620 of FIG. 6, or PE array 720 of FIG. 7), or PEs (e.g., PE 202 of FIG. 2, PE 310 or 320 of FIG. 3, PE 502 of FIG. 5, PE 602 of FIG. 6, or PE 702 of FIG. 7) to perform the method steps or processes. A computer readable medium may include removeable and non-removable storage devices including, but not limited to, Read Only Memory (ROM), Random Access Memory (RAM), compact discs (CDs), digital versatile discs (DVD), etc. In some embodiments, the computer readable medium can be a non-transitory computer readable medium. Common forms of non-transitory media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, an EPROM, a FLASH-EPROM or any other flash memory, NVRAM, a cache, a register, any other memory chip or cartridge, and networked versions of the same. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware, but systems and methods consistent with the present disclosure can be implemented with hardware and software. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the present disclosure are apparent from the detailed specification, and thus, it is intended that the appended claims cover all systems and methods falling within the true spirit and scope of the present disclosure. As used herein, the indefinite articles "a" and "an" mean "one or more." Further, since numerous modifications and variations will readily occur from studying the present disclosure, it is not desired to limit the present disclosure to the exact construction and operation illustrated and described, and accordingly, all suitable modifications and equivalents may be resorted to, falling within the scope of the present disclosure.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A processing unit, comprising:
a 2-dimensional (2D) processing element (PE) array comprising a plurality of PEs, each PE comprising a first input and a second input, the first inputs of the PEs in a first linear array in a first dimension of the PE array being connected in series and the second inputs of the PEs in a second linear array in a second dimension of the PE array being connected in parallel, each PE being configured to perform an operation on data from the first input or second input; and
a plurality of reduce tree units, each reduce tree unit being coupled with the PEs in a linear array in the first dimension or the second dimension of the PE array and configured to perform a first reduction operation, wherein the first reduction operation comprises at least one of: addition (ADD) operation, MIN operation, MAX operation, AND operation, OR operation, XOR operation, or bit concatenation (Bit-Concat) operation.

2. The processing unit of claim 1, further comprising:
a memory interface connected with a first PE in each linear array in the first dimension of the PE array and the PEs in each linear array in the second dimension of the PE array and configured to provide data to the PE array.

3. The processing unit of claim 1, further comprising:
a flex-reduce tree unit or an accumulator coupled with the plurality of reduce tree units and configured to perform a second reduction operation.

4. The processing unit of claim 3, wherein the second reduction operation comprises at least one of addition (ADD) operation, MIN operation, MAX operation, configurable output depth operation, or find operation.

5. The processing unit of claim 1, further comprising:
a control bus coupled with the plurality of PEs and configured to convey instructions.

6. The processing unit of claim 1, wherein each PE comprises:
a first register coupled to the first input and for storing data received via the first input;
a second register coupled to the second input and for storing data received via the second input;
one or more operation units coupled with the first register and the second register and configured to perform an operation on data from the first register or the second register.

7. The processing unit of claim 6, wherein each PE further comprises:
a predicate register coupled with the one or more operation units and configured to indicate whether to ignore the operation of the one or more operation units.

8. The processing unit of claim 6, wherein each PE further comprises:
a scratch memory coupled with the one or more operation units and for storing pre-fetched data.

9. The processing unit of claim 1, wherein the PE is configured to perform at least one of multiplication (MUL) operation, addition (ADD) operation, subtraction (SUB) operation, sum of absolute difference (SAD) operation, absolute value (ABS) operation, shift operation, logical operation, or move (MOV) operation.

10. A processing system, comprising:
a host unit configured to provide instructions;
a processing unit comprising:
a 2-dimensional (2D) processing element (PE) array comprising a plurality of PEs, each PE comprising a first input and a second input, the first inputs of the PEs in a first linear array in a first dimension of the PE array being connected in series and the second inputs of the PEs in a second linear array in a second dimension of the PE array being connected in parallel, each PE being configured to perform an operation on data from the first input or second input; and
a plurality of reduce tree units, each reduce tree unit being coupled with the PEs in a linear array in the first dimension or the second dimension of the PE array and configured to perform a first reduction operation, wherein the processing unit is configured to receive the instructions from the host unit for configuring the PE array and the plurality of reduce tree units; and a flex-reduce tree unit or an accumulator coupled with the plurality of reduce tree units and configured to perform a second reduction operation.

11. A method performed by a processing unit comprising a 2-dimensional (2D) processing element (PE) array comprising a plurality of PEs, each PE comprising a first input and a second input, the first inputs of the PEs in a first linear array in a first dimension of the PE array being connected in series and the second inputs of the PEs in a second linear array in a second dimension of the PE array being connected in parallel, the method comprising:

shifting a first data into the linear array in the first dimension of the PE array of the processing unit via the first inputs of the PEs;

broadcasting a second data to the linear array in the second dimension of the PE array via the second inputs of the PEs;

performing, by the PEs, operations on the shifted data or broadcasted data;

performing, by one or more of a plurality of reduce tree units of the processing unit, a first reduction operation on results from the PEs, each reduce tree unit of the plurality of reduce tree units being coupled with PEs in a linear array in the first dimension or the second dimension of the PE array; and shifting a third data for next-round operations into the linear array in the first dimension of the PE array of the processing unit via first inputs of PEs in the linear array in the first dimension of the PE array during broadcast of the second data.

12. The method of claim 11, further comprising:

broadcasting a fourth data for next-round operations to the linear array in the second dimension of the PE array via second inputs of PEs in the linear array in the second dimension of the PE array during the shift of the first data.

13. The method of claim 11, further comprising:

performing, by a flex-reduce tree unit or an accumulator of the processing unit, a second reduction operation on a result of the first reduction operation.

14. A method for configuring a processing unit including a 2-dimensional (2D) processing element (PE) array comprising a plurality of PEs, each PE comprising a first input and a second input, the first inputs of the PEs in a first linear array in a first dimension of the PE array being connected in series and the second inputs of the PEs in a second linear array in a second dimension of the PE array being connected in parallel, the method comprising:

acquiring instructions for selecting a type of function from multiple types of functions to be performed by the processing unit, wherein a function includes one or more operations; and based on the acquired instructions, configuring the plurality of PEs and a plurality of reduce tree units to perform operations on a first input data and a second input data corresponding to the selected type of function, wherein:

each reduce tree unit is coupled with the PEs in a linear array in the first dimension or the second dimension of the PE array, the plurality of PEs are configured to shift the first input data into the first linear array of the PEs and broadcast the second input data into the second linear array of the PEs, in response to a first type of function being selected, the plurality of PEs are configured to maintain the first input data during broadcast of the second data for performing operations corresponding to the first type of function, in response to a second type of function being selected, the plurality of PEs are configured to maintain the second input data during shift of the first data for performing operations corresponding to the second type of function, and one or more of the plurality of reduce tree units of the processing unit are configured to perform first reduction operations on results from the first linear array of PEs or the second linear array of PEs.

15. The method of claim 14, wherein in response to the first type of function being selected, the plurality of PEs are configured to shift a third input data for next-round operations into the first linear array of PEs during broadcast of the second data.

16. The method of claim 14, wherein in response to the second type of function being selected, the plurality of PEs are configured to broadcast a fourth input data for next-round operations into the second linear array of PEs during shift of the first data.

17. The method of claim 14, wherein a flex-reduce tree unit or an accumulator of the processing unit is configured to perform a second reduction operation on results of the first reduction operations.

18. The method of claim 14, wherein the plurality of PEs broadcast the second input data into the second linear array of PEs in the second dimension of the 2D PE, the second dimension being different from the first dimension.

* * * * *